(12) United States Patent
Son et al.

(10) Patent No.: US 10,763,945 B2
(45) Date of Patent: Sep. 1, 2020

(54) METHOD FOR DETECTING BLOCKAGE AND ELECTRONIC DEVICE THEREOF

(71) Applicant: SAMSUNG ELECTRONICS CO., LTD., Suwon-si, Gyeonggi-do (KR)

(72) Inventors: Dongil Son, Suwon-si (KR); Hyoseok Na, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/740,257

(22) Filed: Jan. 10, 2020

(65) Prior Publication Data
US 2020/0153499 A1 May 14, 2020

Related U.S. Application Data

(63) Continuation of application No. 16/232,365, filed on Dec. 26, 2018, now Pat. No. 10,554,285.

(30) Foreign Application Priority Data

Dec. 28, 2017 (KR) .......................... 10-2017-0182695

(51) Int. Cl.
*H04B 7/04* (2017.01)
*H01Q 1/24* (2006.01)
(Continued)

(52) U.S. Cl.
CPC ......... *H04B 7/0695* (2013.01); *H04B 7/0608* (2013.01); *H04B 7/0802* (2013.01);
(Continued)

(58) Field of Classification Search
None
See application file for complete search history.

(56) References Cited

U.S. PATENT DOCUMENTS 5,574,981 A * 11/1996 Ahonen ................. G01R 29/10
455/67.14
6,313,644 B1 * 11/2001 Kim ....................... H04B 17/103
324/645
(Continued)

FOREIGN PATENT DOCUMENTS

KR 10-2015-0067920 6/2015
KR 10-2017-0115531 10/2017

OTHER PUBLICATIONS

International Search Report dated Mar. 29, 2019 in counterpart International Patent Application No. PCT/KR2018/016479.
Son et al., U.S. Appl. No. 16/232,365, filed Dec. 26, 2018.

*Primary Examiner* — Tuan A Tran
(74) *Attorney, Agent, or Firm* — Nixon & Vanderhye, P.C.

(57) ABSTRACT

Disclosed is an electronic device which includes an antenna array including a plurality of antenna elements and a wireless communication circuit configured to transmit and/or receive a signal having a frequency in a range of 3 GHz to 300 GHz. The wireless communication circuit includes a plurality of pairs of transmit and receive paths. The wireless communication circuit is configured to allow a first pair of the plurality of pairs to use the transmit path of the first pair and a second pair of the plurality of pairs to use the receive path of the second pair, to transmit a first signal using the transmit path of the first pair, to monitor the receive path of the second pair, and to determine whether the first signal is at least partially blocked, based at least in part on a result of monitoring the receive path.

16 Claims, 24 Drawing Sheets

US 10,763,945 B2

Page 2

(51) Int. Cl.
  *H04B 7/06* (2006.01)
  *H04B 17/10* (2015.01)
  *H04B 17/14* (2015.01)
  *H04B 7/08* (2006.01)
  *H04W 52/36* (2009.01)
  *H04B 17/318* (2015.01)

(52) U.S. Cl.
  CPC ......... *H04B 17/103* (2015.01); *H04B 17/14* (2015.01); *H04B 17/318* (2015.01); *H04W 52/367* (2013.01)

(56) References Cited

U.S. PATENT DOCUMENTS

| | | | |
|---|---|---|---|
| 6,531,980 B1* | 3/2003 | Jones | G01S 7/2813 342/157 |
| 8,159,399 B2 | 4/2012 | Dorsey et al. | |
| 8,417,296 B2* | 4/2013 | Caballero | H04B 1/3838 455/566 |
| 8,761,296 B2 | 6/2014 | Zhang et al. | |
| 8,781,420 B2 | 7/2014 | Schlub et al. | |
| 8,892,049 B2 | 11/2014 | Rosenblatt et al. | |
| 9,071,336 B2* | 6/2015 | Schlub | H01Q 1/243 |
| 9,154,608 B2* | 10/2015 | Toksvig | H01Q 1/243 |
| 9,179,299 B2* | 11/2015 | Schlub | H01Q 1/243 |
| 9,214,717 B2* | 12/2015 | Tudosoiu | H01Q 21/28 |
| 9,225,396 B2 | 12/2015 | Maltsev et al. | |
| 9,362,991 B2 | 6/2016 | Maltsev et al. | |
| 9,379,456 B2* | 6/2016 | Shtrom | H01Q 1/38 |
| 9,444,152 B2* | 9/2016 | Park | H01Q 25/04 |
| 9,473,220 B2* | 10/2016 | Dinur | H04B 7/0404 |
| 9,583,828 B2* | 2/2017 | Kasher | H01Q 3/00 |
| 9,680,218 B2 | 6/2017 | Katz et al. | |
| 9,735,899 B2* | 8/2017 | Moshe | H04B 17/12 |
| 9,877,659 B2* | 1/2018 | Lee | H01Q 1/36 |
| 9,940,827 B2* | 4/2018 | Suomela | H04R 1/1041 |
| 9,954,269 B2* | 4/2018 | Qi | H04B 1/005 |
| 10,028,290 B2 | 7/2018 | Jo et al. | |
| 10,044,102 B2* | 8/2018 | Belot | H01Q 1/38 |
| 10,148,304 B2* | 12/2018 | Chang | H04W 52/283 |
| 10,571,502 B2* | 2/2020 | Pascolini | G01R 29/10 |
| 2009/0096683 A1 | 4/2009 | Rosenblatt et al. | |
| 2009/0295648 A1* | 12/2009 | Dorsey | H01Q 1/2266 343/702 |
| 2010/0120415 A1* | 5/2010 | Urquhart | H01Q 1/1257 455/424 |
| 2010/0310005 A1* | 12/2010 | Takagi | H04B 7/061 375/295 |
| 2011/0250928 A1 | 10/2011 | Schlub et al. | |
| 2013/0308717 A1* | 11/2013 | Maltsev | H04B 7/0417 375/267 |
| 2013/0322562 A1 | 12/2013 | Zhang et al. | |
| 2013/0342421 A1 | 12/2013 | Katz et al. | |
| 2014/0206297 A1 | 7/2014 | Schlub et al. | |
| 2014/0235287 A1 | 8/2014 | Maltsev et al. | |
| 2015/0249916 A1 | 9/2015 | Schlub et al. | |
| 2015/0365908 A1 | 12/2015 | Maltsev et al. | |
| 2016/0233580 A1 | 8/2016 | Aparin et al. | |
| 2016/0323898 A1 | 11/2016 | Jo et al. | |
| 2017/0062948 A1 | 3/2017 | Artemenko et al. | |
| 2017/0194713 A1* | 7/2017 | Chang | H01Q 1/246 |
| 2018/0041261 A1* | 2/2018 | Modarres Razavi | H04B 7/0408 |
| 2019/0025403 A1* | 1/2019 | Hoffman | H04B 17/103 |

\* cited by examiner

METHOD FOR DETECTING BLOCKAGE AND ELECTRONIC DEVICE THEREOF

CROSS-REFERENCE TO RELATED APPLICATION

This application is a continuation of U.S. application Ser. No. 16/232,365, filed on Dec. 26, 2018, which claims priority to Korean Patent Application No. 10-2017-0182695, filed on Dec. 28, 2017. The contents of each of these applications are incorporated herein in their entirety.

BACKGROUND

1. Field

The present disclosure relates to a method and an electronic device for detecting blockage.

2. Description of Related Art

After commercialization of the $4^{th}$ generation (4G) communication system, a communication system (e.g., a $5^{th}$ generation (5G) communication system, a pre-5G communication system, or a 5G NR (New Radio)) which transmits or receives a signal in an mmWave band (e.g., a frequency band having a center frequency of 20 GHz or higher) is being developed to satisfy a demand on an increasing wireless data traffic. An antenna array technology for beamforming is being introduced to the 5G communication system for the purpose of preventing/reducing path loss of the signal in the mmWave band and increasing a transmission distance of the signal. The beamforming may refer, for example, to a technology for allowing a transmit or receive a signal to have directivity.

An electronic device may perform the beamforming, and may receive a signal having a plurality of direcitivies through a plurality of antennas (or an antenna array). Also, a beam corresponding to the optimum beamforming may be determined by measuring a received signal strength indication with regard to each direction. For example, the optimum beam may be a beam corresponding to a line of sight (LoS) between an electronic device and a transmission side (e.g., a base station). The procedure in which the electronic device determines the optimum beam may be referred to as a "beam measurement procedure", "beam search", or "beam scanning".

The above information is presented as background information only to assist with an understanding of the present disclosure. No determination has been made, and no assertion is made, as to whether any of the above might be applicable as prior art with regard to the present disclosure.

In wireless communication associated with the mmWave band, a blockage may occur due to an object such as a grip by a user of an electronic device. Since the mmWave signal has low diffraction, the quality of communication may be significantly degraded due to the blockage. Accordingly, there is required a method which may detect a blockage in a signal of an electronic device and may select an appropriate beam so as to cope with the blockage.

SUMMARY

Aspects of the present disclosure address at least the above-mentioned problems and/or disadvantages and provide at least the advantages described below. Accordingly, an aspect of the present disclosure is to provide a method and an electronic device, which may detect a blockage through a transmission/reception control of a radio frequency (RF) chain and may search for an optimum beam based on the detected blockage.

In accordance with an aspect of the present disclosure, an electronic device may include a housing, an antenna array including a plurality of antenna elements positioned within the housing, and a wireless communication circuit configured to transmit and/or receive a signal having a frequency in a range of about 3 GHz and 300 GHz. The wireless communication circuit may include a plurality of pairs of transmit and receive paths. The wireless communication circuit may be configured to allow a first pair of the plurality of pairs to use the transmit path of the first pair and a second pair of the plurality of pairs to use the receive path of the second pair, to transmit a first signal using the transmit path of the first pair, to monitor the receive path of the second pair, and to determine whether the first signal is at least partially blocked based at least partially on a result of monitoring the receive path.

In accordance with another aspect of the present disclosure, an electronic device may include at least one antenna array including a plurality of antenna elements, and a communication circuit electrically connected with the at least one antenna array. Each of the plurality of antenna elements may be selectively connected to a receive path and/or a transmit path. The communication circuit may be configured to set at least one first antenna element and at least one second antenna element of the plurality of antenna elements, to transmit a reference signal through the at least one first antenna element, and to detect at least one blocked antenna element of the at least one first antenna element based at least on a signal measured through the at least one second antenna element.

According to various embodiments of the present disclosure, a blockage may be detected without a grip sensor by detecting the blockage using an RF chain.

Also, according to various embodiments of the present disclosure, a beam scan may be performed using an antenna element from among a plurality of antenna elements in which a blockage is not detected, thus decreasing a beam scan time.

A variety of effects directly or indirectly understood through this disclosure may be provided.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Below, various example embodiments of the present disclosure may be described with reference to accompanying drawings. The embodiments and terms used with regard to the embodiments are described below. Accordingly, those of ordinary skill in the art will recognize that various modifications, equivalents, and/or alternatives on the various example embodiments described herein can be variously made without departing from the scope of the present disclosure.

Figure 1:
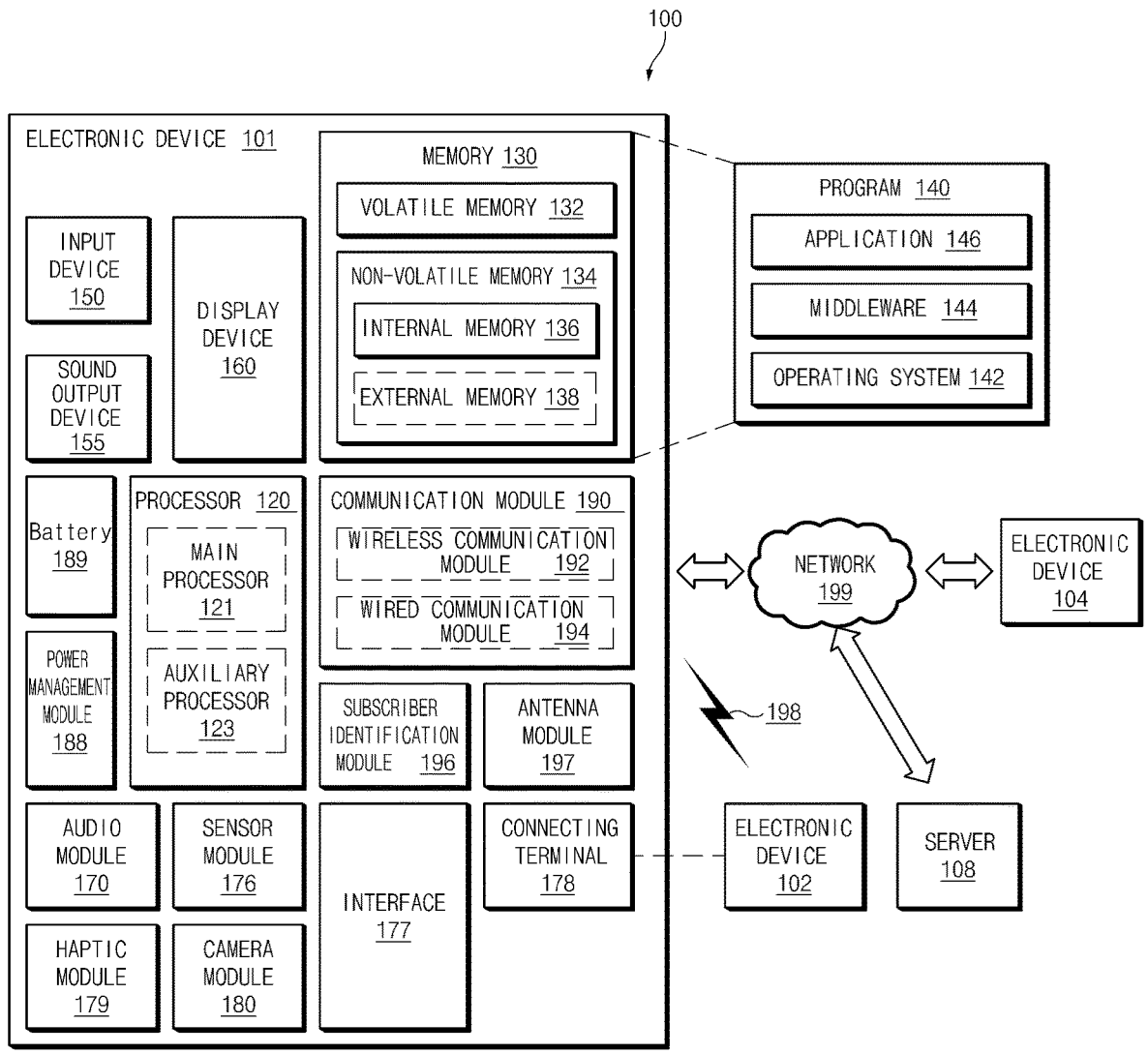
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
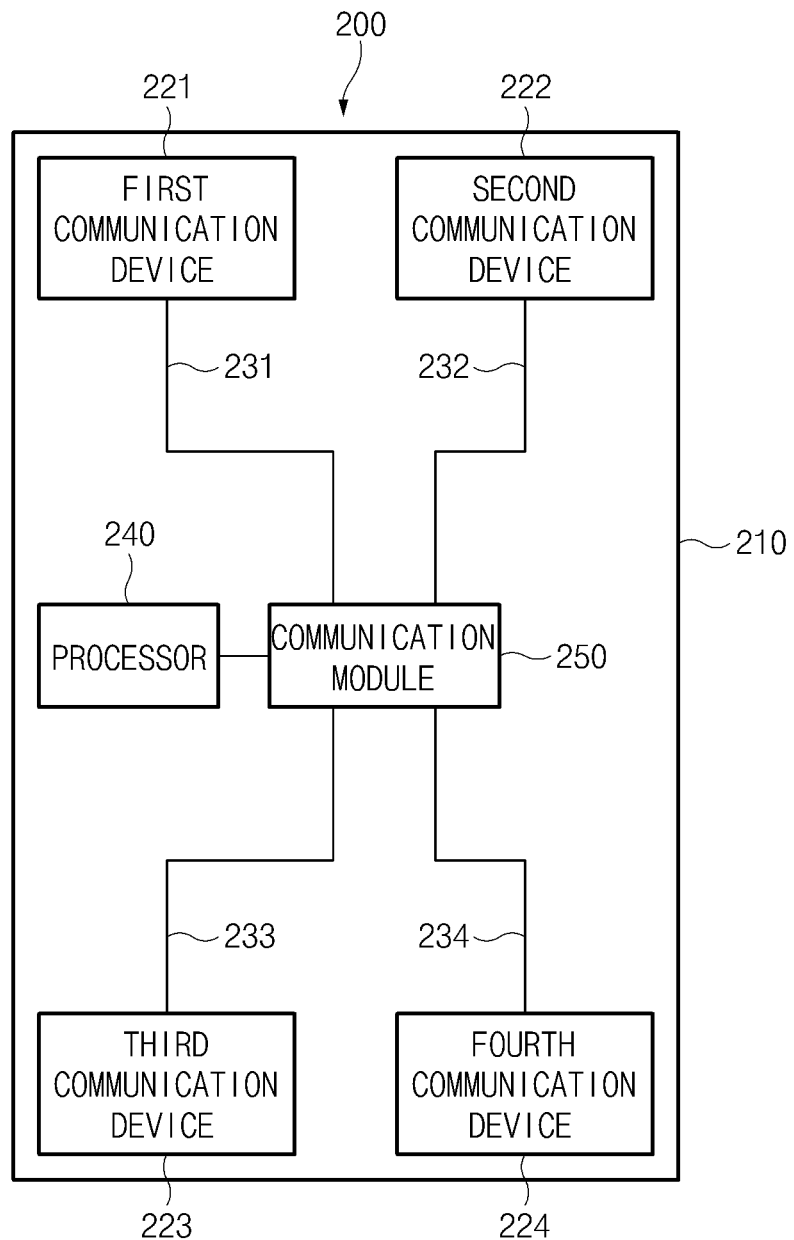
FIG. 2 is a block diagram illustrating an electronic device supporting 5G communication according to various embodiments.

FIG. 2 is a diagram illustrating a block diagram of an electronic device supporting 5G communication according to various embodiments.

Referring to FIG. 2, an electronic device 200 (e.g., the electronic device 101 of FIG. 1) may include a housing 210, a processor (e.g., including processing circuitry) 240 (e.g., the processor 120 of FIG. 1), a communication module (e.g., including communication circuitry) 250 (e.g., the communication module 190 of FIG. 1), a first communication device (e.g., including communication circuitry) 221, a second communication device (e.g., including communication circuitry) 222, a third communication device (e.g., including communication circuitry) 223, a fourth communication device (e.g., including communication circuitry) 224, a first conductive line 231, a second conductive line 232, a third conductive line 233, and/or a fourth conductive line 234.

According to an embodiment, the housing 210 may protect any other components of the electronic device 200. The housing 210 may include, for example, a front plate, a back plate facing away from (a direction opposite) the front plate, and a side member (or a metal frame) surrounding a space between the front plate and the back plate. The side member may be attached to the back plate or may be integrally formed with the back plate.

According to an embodiment, the electronic device 200 may include at least one communication device. For example, the electronic device 200 may include at least one of the first communication device 221, the second communication device 222, the third communication device 223, or the fourth communication device 224, each of which may include various communication circuitry.

According to an embodiment, the first communication device 221, the second communication device 222, the third communication device 223, or the fourth communication device 224 may include various communication circuitry and be positioned within the housing 210. According to an embodiment, when viewed from above the front plate of the electronic device 200, the first communication device 221 may be positioned on the left top (or left top corner) of the electronic device 200, the second communication device 222 may be positioned on the right top (or right top corner) of the electronic device 200, the third communication device 223 may be positioned on the left bottom (or left bottom corner) of the electronic device 200, and the fourth communication device 224 may be positioned on the right bottom (or right bottom corner) of the electronic device 200.

A layout of communication devices (e.g., 221, 222, 223, and 224) is not limited to an example of FIG. 2. For example, the electronic device 200 may include any communication device at any location in the housing. According to an embodiment, the electronic device 200 may include the first communication device 221, the second communication device 222, and the third communication device 223. For example, with respect to the front plate of the electronic device 200, the first communication device 221 may be positioned on the left top of the electronic device 200, the second communication device 222 may be positioned on the right top end of the electronic device 200, and the third communication device 223 may be positioned on the left, the center, or the right of a center portion (or a center bottom portion) of the electronic device 200.

According to an embodiment, the processor 240 may include various processing circuitry, such as, for example, and without limitation, one or more of a central processing unit, an application processor (AP), a graphic processing unit (GPU), an image signal processor of a camera, a baseband processor (BP) (or a communication processor (CP)), or the like. According to an embodiment, the processor 240 may be implemented with a system on chip (SoC) or a system in package (SiP).

According to an embodiment, the communication module 250 may include various communication circuitry and be electrically connected with at least one communication device using at least one conductive line. For example, the communication module 250 may be electrically connected with the first communication device 221, the second communication device 222, the third communication device 223, and/or the fourth communication device 224 using the first conductive line 231, the second conductive line 232, the third conductive line 233, and/or the fourth conductive line 234, respectively. The communication module 250 may include various communication circuitry, such as, for example, and without limitation, a baseband processor (BP), a radio frequency integrated circuit (RFIC), an intermediate frequency integrated circuit (IFIC), or the like. The communication module 250 may include a processor (e.g., a BP) which is independent of the processor 240 (e.g., an AP). The first conductive line 231, the second conductive line 232, the third conductive line 233, and/or the fourth conductive line 234 may include, for example, a coaxial cable and/or a flexible printed circuit board (FPCB).

According to an embodiment, the communication module 250 may include a first BP (not illustrated) or a second BP (not illustrated). The electronic device 200 may further include one or more interfaces for supporting inter-chip communication between the first BP (or the second BP) and the processor 240. The processor 240 and the first BP or the second BP may transmit/receive data using the inter-chip interface (e.g., an inter processor communication channel).

According to an embodiment, the first BP and/or the second BP may provide an interface for performing communication with any other entities. The first BP may support, for example, wireless communication with regard to a first network (not illustrated). The second BP may support, for example, wireless communication with regard to a second network (not illustrated).

According to an embodiment, the first BP and/or the second BP may form one module with the processor 240. For example, the first BP and/or the second BP may be integrally formed with the processor 240. For another example, the first BP and/or the second BP may be positioned within one chip or may be implemented in the form of an independent chip. According to an embodiment, the processor 240 and at least one BP (e.g., the first BP) may be integrally formed within one chip (e.g., a SoC), and the other BP (e.g., the second BP) may be implemented in the form of an independent chip.

According to an embodiment, the communication device 221, 222, 223, and/or 224 may up-convert or down-convert a frequency. For example, the first communication device 221 may up-convert an intermediate frequency (IF) signal received through the first conductive line 231. For another example, the first communication device 221 may down-convert an mmWave signal received through an antenna array (not illustrated) and may transmit the down-converted signal using the first conductive line 231. According to an embodiment, through the conductive line 231, 232, 233, and/or 234, the communication device 221, 222, 223, and/or 224 may transmit a signal directly to the processor 240 and/or may receive a signal directly from the processor 240. For example, the communication module 250 may be omitted or may be integrated in the processor 240. For example, operations of the communication module 250 described in the disclosure may be performed by the processor 240 and/or the communication device 221, 222, 223, and/or 224.

According to an embodiment, the first network (not illustrated) and/or the second network (not illustrated) may correspond to the network 199 of FIG. 1. According to an embodiment, the first network (not illustrated) and the second network (not illustrated) may include a 4G network and a 5G network, respectively. The 4G network may, for example, support a long term evolution (LET) protocol or an LTE-advanced (LTE-A) protocol provided by the 3rd generation partnership project (3GPP). The 5G network may support, for example, a new radio (NR) protocol provided by the 3 GPP.

Figure 3:
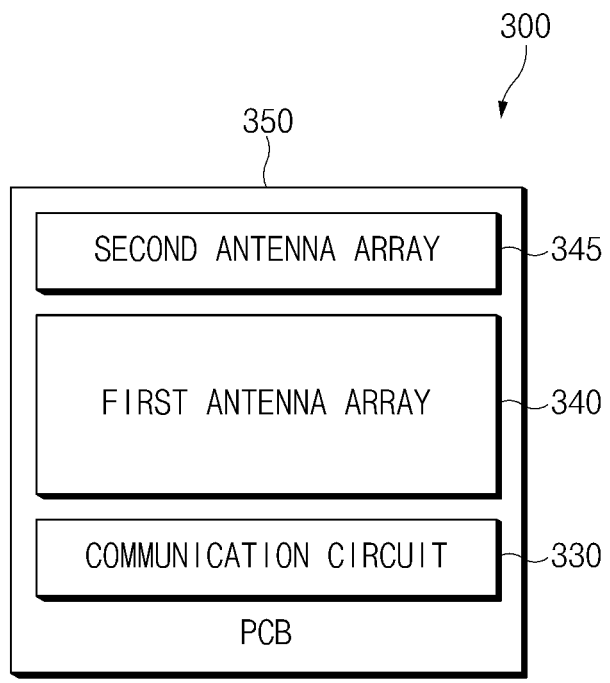
FIG. 3 is a block diagram illustrating a communication device according to various embodiments.

FIG. 3 is a block diagram illustrating a communication device according to various embodiments.

Referring to FIG. 3, a communication device 300 (e.g., the first communication device 221, the second communication device 222, the third communication device 223, and/or the fourth communication device 224 of FIG. 2) may include at least one of a communication circuit 330 (e.g., an RFIC), a printed circuit board (PCB) 350, a first antenna array 340, and/or a second antenna array 345.

According to an embodiment, the communication circuit 330, the first antenna array 340, and/or the second antenna array 345 may be positioned on the PCB 350. For example, the first antenna array 340 and/or the second antenna array 345 may be positioned on a first surface of the PCB 350, and the communication circuit 330 may be positioned on a second surface of the PCB 350. For another example, the first antenna array 340 and/or the second antenna array 345 may be positioned on the first surface of the PCB 350, and the communication circuit 330 may be positioned on the first surface. The PCB 350 may, for example, and without limitation, include a coaxial cable connector, a board to board (B-to-B) connector, or the like, for electrical connection with any other PCB (e.g., a PCB on which the communication module 250 of FIG. 2 is positioned) using a transmission line (e.g., the conductive line 231, 232, 233, or 234 of FIG. 2 and/or a coaxial cable). The PCB 350 may be connected to the PCB, on which the communication module 250 is positioned, through a coaxial cable, using a coaxial cable connector, and the coaxial cable may be used to transmit a radio frequency (RF) signal and/or a transmit and receive intermediate frequency (IF) signal. For another example, a power or any other control signal may be transmitted through the B-to-B connector.

According to an embodiment, the first antenna array 340 and/or the second antenna array 345 may include a plurality of antenna elements. Each of the plurality of antenna elements may include, for example, and without limitation, a patch antenna, a loop antenna, a dipole antenna, or the like. For example, an antenna element included in the first antenna array 340 may be a patch antenna for forming a beam toward a back plate of the electronic device 200. For another example, an antenna element included in the second antenna array 345 may be a dipole antenna or a loop antenna for forming a beam toward a side member of the electronic device 200.

According to an embodiment, the communication circuit 330 may support a radio frequency signal in a frequency band ranging from 24 GHz to 30 GHz and/or from 37 GHz to 40 GHz. For example, the communication circuit 330 may support a radio frequency signal in a frequency band ranging from 3 GHz to 300 GHz. According to an embodiment, the communication circuit 330 may up-convert and/or down-convert a frequency. For example, the communication circuit 330 included in the first communication device 221 may up-convert an IF signal received from the communication module 250 through the first conductive line 231. For another example, the communication circuit 330 may down-convert a millimeter wave (mmWave) signal received through the first antenna array 340 and/or the second antenna array 345 included in the first communication device 221 and may transmit the down-converted signal to the communication module 250 using the first conductive line 231.

Figure 4:
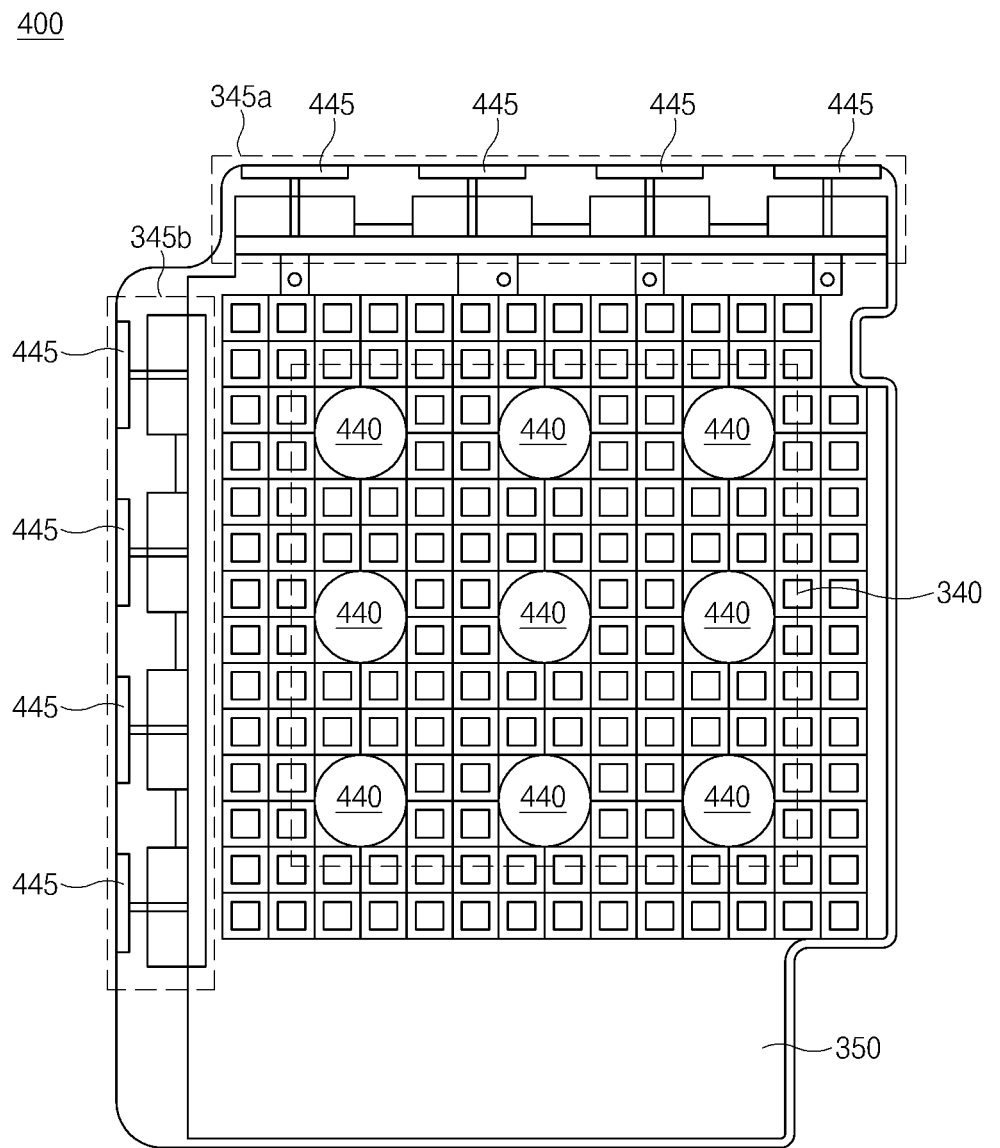
FIG. 4 is a diagram illustrating an example of a communication device according to various embodiments.

FIG. 4 is a diagram illustrating an example of a communication device 400 according to various embodiments.

Referring to FIG. 4, a communication device (e.g., including communication circuitry) 400 (e.g., the communication circuit 330 of FIG. 3) according to various embodiments may include the first antenna array 340 and a second antenna array 345*a* and 345*b* positioned on the PCB 350. For example, a communication circuit (not illustrated) (e.g., the communication circuit 330 of FIG. 3) which is electrically connected with the first antenna array 340 and the second antenna array 345*a* and 345*b* may be mounted on a back surface of the PCB 350.

According to various embodiments, the first antenna array 340 and the second antenna array 345*a* and 345*b* may include a plurality of antenna elements. According to an embodiment, the first antenna array 340 may include a plurality of patch antenna elements 440. For example, the first antenna array 340 may include at least one patch antenna element (440) row and at least one patch antenna element (440) column. According to an embodiment, the second antenna array 345*a* and 345*b* may include a plurality of dipole antenna elements 445. The second antenna array 345*a* and 345*b* may include at least one dipole antenna element (445) row and/or at least one dipole antenna element (445) column. A configuration (or a layout) of the first antenna array 340 and the second antenna array 345*a* and 345*b* of FIG. 4 is provided by way of example, and the configuration of the first antenna array 340 and the second antenna array 345*a* and 345*b* of the present disclosure is not limited to an example of FIG. 4.

According to various embodiments, the communication device 400 may be mounted at any location in the housing 210 of an electronic device (e.g., the electronic device 200 of FIG. 2). According to an embodiment, the communication device 400 may radiate an RF signal through a front surface and/or a back surface of the electronic device 200 (e.g., through a surface parallel to a display (e.g., the display device 160 of FIG. 1) of the electronic device 200). According to an embodiment, the communication device 400 may radiate an RF signal through at least one side surface of the electronic device 200 (e.g., through a surface perpendicular to a display (e.g., the display device 160 of FIG. 2) of the electronic device 200).

Figure 5A:
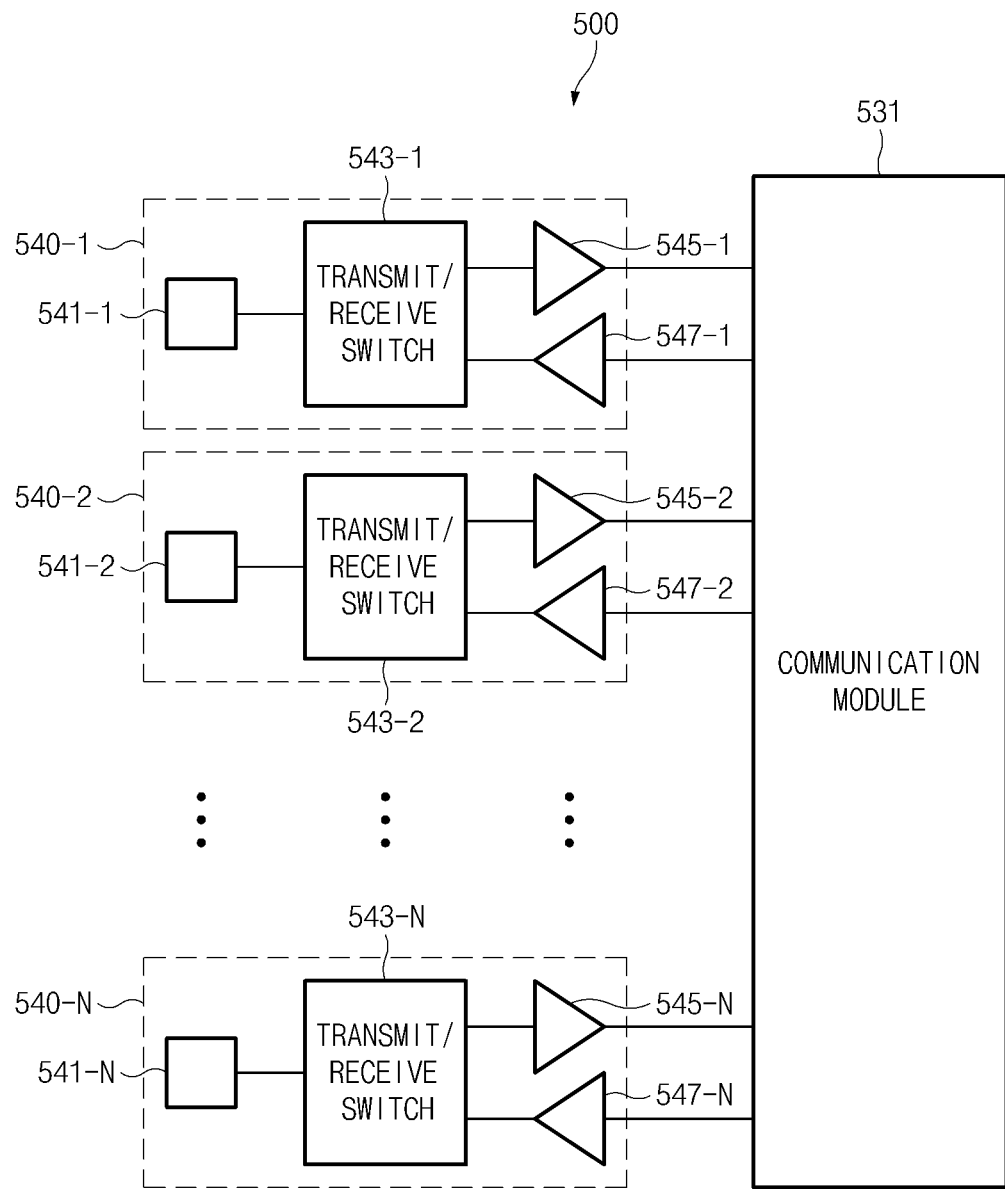
FIGS. 5A and 5B are block diagrams illustrating a radio frequency (RF) chain according to various embodiments.

FIG. 5A is a block diagram 500 illustrating a radio frequency (RF) chain according to various embodiments.

According to various embodiments, a communication module (e.g., including communication circuitry) 531 (e.g., the communication module 250 of FIG. 2) may be connected with a plurality of RF chains 540-1, 540-2 . . . and 540-N. According to an embodiment, the communication module 531 may be connected with "N" RF chains 540-1, 540-2 . . . and 540-N(N being, for example, and without limitation, an integer of 3 or more). For example, the communication module 531 may be connected with 16 RF chains. For example, transmit/receive switches 543-1 to 543-N, amplifiers 545-1 to 545-N, and amplifiers 547-1 to 547-N may constitute a front end (e.g., the communication circuit 330 of FIG. 3). A structure of the RF chains 540-1, 540-2 . . . and 540-N illustrated in FIG. 5A is provided by way of example, and the communication module 531 may include two or more RF chains.

According to an embodiment, when the transmit/receive switch 543-1, 543-2 . . . 543-N is connected to a receive path, the RF chain 540-1, 540-2 . . . 540-N may amplify a signal received through an antenna element 541-1, 541-2 . . . 541-N (e.g., an antenna element included in the first antenna array 340 or the second antenna array 345 of FIG. 3) using the amplifier 545-1, 545-2 . . . 545-N. According to an embodiment, when the transmit/receive switch 543-1, 543-2 . . . 543-N is connected to a transmit path, the RF chain 540-1, 540-2 . . . 540-N may transmit a signal amplified using the amplifier 547-1, 547-2 . . . 547-N through the antenna element 541-1, 541-2 . . . 541-N. For example, the antenna elements 541-1, 541-2 . . . and 541-N may be positioned (e.g., on the PCB 350) to face the same direction. The structure of the RF chains 540-1, 540-2 . . .

and 540-N of FIG. 5A is an example of a simplified structure, and each of the RF chains 540-1, 540-2 . . . and 540-N may further include components which are not illustrated in FIG. 5A. The structure of the RF chains 540-1, 540-2 . . . and 540-N of FIG. 5A is an example of a logical structure, and the RF chains 540-1, 540-2 . . . and 540-N may be implemented in various manners. For example, the transmit/receive switches 543-1 to 543-N may be implemented with one component which may control a transmit path and/or a receive path with regard to all the RF chains 540-1 to 540-N. For example, the transmit/receive switches 543-1 to 543-N and/or the amplifiers 545-1 to 545-N and 547-1 to 547-N may be implemented within the communication module 531.

Figure 5B:
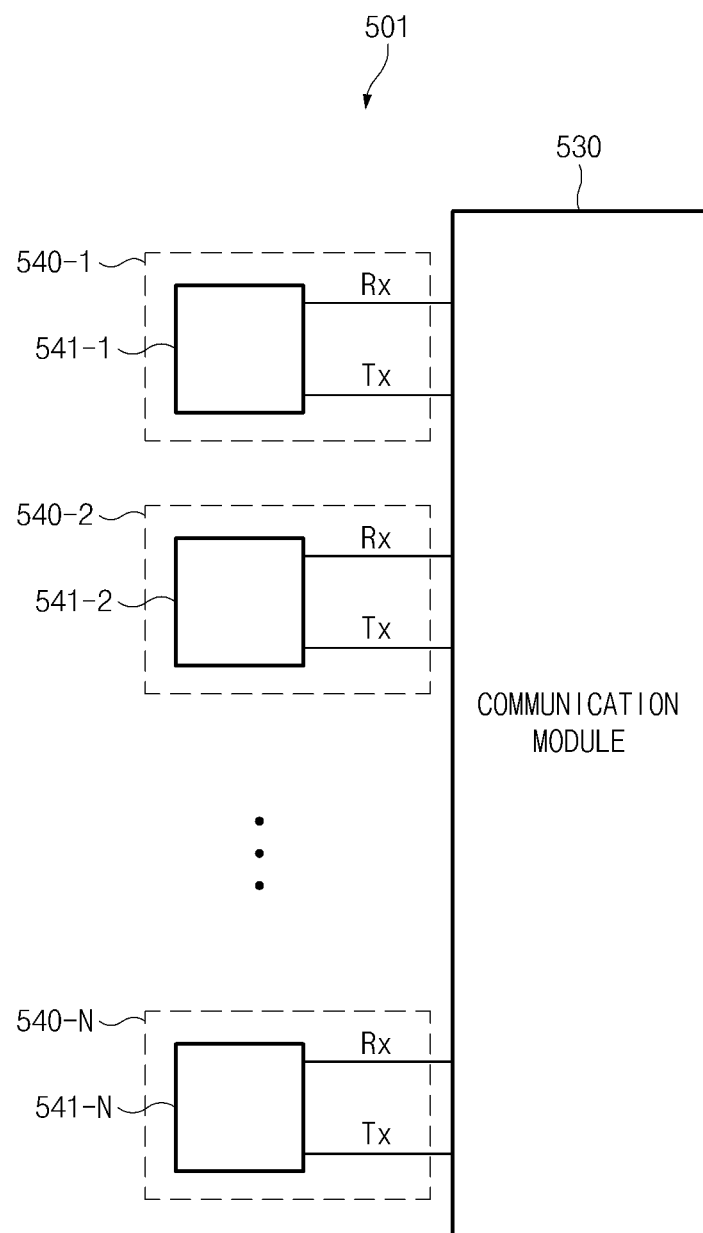

FIG. 5B is a block diagram 501 of an RF chain according to various embodiments.

According to various embodiments, a communication circuit (e.g., including communication circuitry) 530 (e.g., the communication circuit 330 of FIG. 3) may be connected with the plurality of RF chains 540-1, 540-2 . . . and 540-N. According to an embodiment, the communication circuit 530 may be connected with the "N" RF chains 540-1, 540-2 . . . and 540-N(N being an integer of, for example, and without limitation, 3 or more). According to an embodiment, the communication circuit 530 may communicate with the processor 240 directly or through a communication module (e.g., the communication module 250 of FIG. 2). For example, the communication circuit 530 may be connected to the communication module 250 through a conductive line (e.g., the conductive line 231, 232, 233, or 234 of FIG. 2). A structure of the RF chain 540-1, 540-2 . . . 540-N illustrated in FIG. 5B is provided by way of example, and the communication circuit 530 may include two or more RF chains.

According to an embodiment, a transmit path Tx and a receive path Rx which are connected with the communication circuit 530 may be connected to each of the antenna elements 541-1, 541-2 . . . and 541-N. For example, the communication circuit 530 may include a switching means (e.g., the transmit/receive switches 543-1 to 543-N) for using the respective antenna elements 541-1, 541-2 . . . and 541-N for the purpose of receiving or transmitting a signal. For another example, the communication circuit 530 may include a transmit switch which may change a transmit path of each of the antenna elements 541-1, 541-2 . . . and 541-N. For example, the communication circuit 530 may include amplifiers (e.g., the amplifiers 545-1 to 545-N and 547-1 to 547-N of FIG. 5A), each of which is used to amplify a signal of the receive path Rx and/or the transmit path Tx. The structure of the RF chains 540-1, 540-2 . . . and 540-N of FIG. 5B is an example of a simplified structure, and each of the RF chains 540-1, 540-2 . . . and 540-N may further include components which are not illustrated in FIG. 5B.

Figure 6:
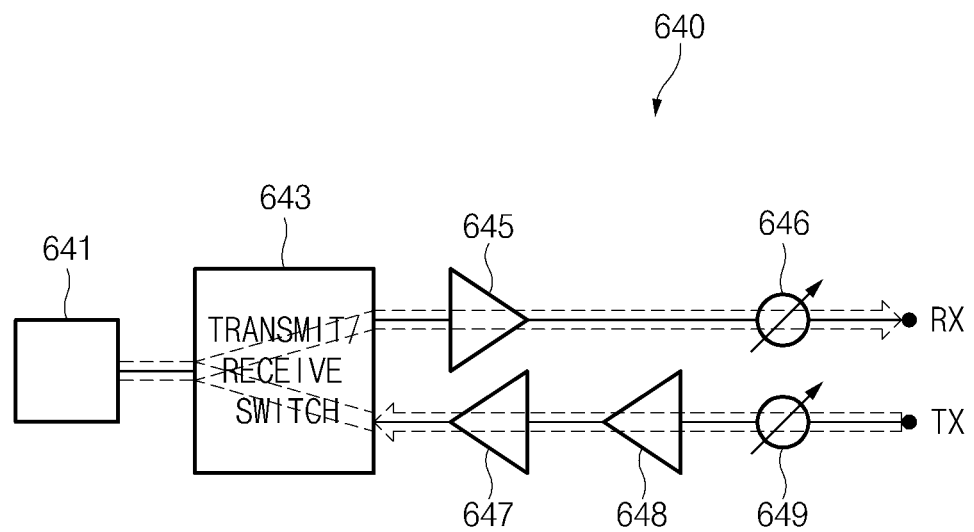
FIG. 6 is a diagram illustrating a structure an RF chain according to various embodiments.

FIG. 6 is a diagram illustrating a structure an RF chain 640 according to various embodiments.

Referring to FIG. 6, the RF chain 640 (e.g., the RF chains 540-1, 540-2 . . . or 540-N of FIG. 5A) according to various embodiments may include an antenna element 641 (e.g., the antenna element 541-1, 541-2 . . . or 541-N of FIG. 5A), a transmit/receive switch 643 (e.g., the transmit/receive switch 543-1, 543-2 . . . or 543-N of FIG. 5A), a power amplifier 645 (e.g., the amplifier 547-1, 547-2 . . . or 547-N of FIG. 5A), a phase shifter 646, a power amplifier 647, a pre-power amplifier 648, and a phase shifter 649.

According to an embodiment, a communication module (e.g., the communication module 531 of FIG. 5A) may include various communication circuitry and connect the antenna element 641 to the receive path Rx or the transmit path Tx by controlling the transmit/receive switch 643. For example, the RF chain 640 may include a pair of a receive path and a transmit path. According to an embodiment, the communication module 531 may perform beamforming on a receive signal by controlling the power amplifier 645 and the phase shifter 646 of the receive path. According to various embodiments, the communication module 531 may perform beamforming on a transmit signal by controlling the power amplifier 647, the pre-power amplifier 648, and the phase shifter 649 of the transmit path.

A structure of the RF chain 640 illustrated in FIG. 6 is provided by way of example, and the structure of the RF chain 640 of the present disclosure is not limited thereto. According to an embodiment, as illustrated in FIG. 5B, the antenna element 641 may be connected to two paths which may be respectively connected to the transmit path Tx and the receive path Rx. According to an embodiment, the RF chain 640 may include a separate transmit path (not illustrated) and/or a separate receive path (not illustrated) which may bypass the phase shifter 646 and/or 649. For example, the RF chain 640 may sense a signal of a lower power by receiving the signal through the path (not illustrated) bypassing the phase shifter 646. For example, the RF chain 640 may transmit a signal of a higher power by transmitting the signal through the path (not illustrated) bypassing the phase shifter 649. According to another embodiment, the transmit/receive switch 643 may be configured to connect a plurality of transmit paths Tx or a plurality of receive paths Rx to one antenna element (e.g., the antenna element 641).

Below, an operation of the communication module 531 will be described in greater detail with reference to FIG. 5A.

Returning to FIG. 5A, according to various embodiments, the communication module 531 may set each of the RF chains 540-1, 540-2 . . . and 540-N to an RF chain for transmission or an RF chain for reception. For example, the communication module 531 may control the transmit/receive switch 543-1, 543-2 . . . 543-N to electrically connect at least one antenna element 541-1, 541-2 . . . and/or 541-N to a transmit path or a receive path. According to an embodiment, the communication module 531 may set all the RF chains 540-1, 540-2 . . . and 540-N to a transmit or receive RF chain. According to another embodiment, the communication module 531 may set at least one RF chain 540-1, 540-2 . . . and/or 540-N to a transmit RF chain and may set at least one RF chain to a receive RF chain.

According to various embodiments, the communication module 531 may transmit a signal (e.g., a reference signal) through at least one RF chain 540-1, 540-2 . . . and/or 540-N and may receive or sense a signal (e.g., a signal reflected by a blockage) induced by the transmitted signal through at least one RF chain 540-1, 540-2 . . . and/or 540-N. For example, the communication module 531 may monitor at least one RF chain 540-1, 540-2 . . . and/or 540-N (e.g., a receive RF chain) and may determine whether the transmitted signal is at least partially blocked, based at least partially on a result of the monitoring. According to an embodiment, the communication module 531 may detect a blockage associated with at least a portion of an electronic device (e.g., the electronic device 200 of FIG. 2), a communication device (e.g., the communication device 300 of FIG. 3), and/or an antenna array (e.g., the first antenna array 340 and/or the second antenna array 345 of FIG. 3). Below, an operating mode of the communication module 531 for blockage detection may be referred to as a "scan mode".

According to various embodiments, the communication module 531 may operate in the scan mode based on a specified condition. For example, in the case where the specified condition (e.g., the quality of communication, movement information of an electronic device (e.g., the electronic device 101 of FIG. 1, the quality of service (QoS), and/or a specified period) is satisfied, the scan mode may be triggered. According to an embodiment, the communication module 531 may operate in the scan mode based on the quality of communication. For example, and without limitation, in the case where the data throughput is not greater than a specified first range, in the case where a block error rate (BLER) exceeds a specified second range, in the case where a received power of a reference signal received from an external electronic device (e.g., a base station or a user device) is not greater than a specified third range, or the like, the communication module 531 may operate in the scan mode. According to an embodiment, the communication module 531 may operate in the scan mode based on the QoS. For example, in the case where a specified reference (e.g., a traffic of a specified range or greater) is not satisfied with regard to the QoS, the communication module 531 may operate in the scan mode. For example, the QoS traffic may be differently set based on a type of a data traffic (e.g., video data, voice data, or multimedia data). For example, the data traffic associated with the QoS may be set based on a type (e.g., the image quality) of streaming content, based on a type of a call (e.g., a video call, a hologram call, or the like), or the like. According to an embodiment, the communication module 531 may operate in the scan mode based on the specified period. For example, the specified period may be a value which is defined in advance or is received from a base station. For another example, the specified period may be determined based at least on the quality of communication. According to an embodiment, the communication module 531 may operate in the scan mode based on a movement of an electronic device (e.g., the electronic device 101 of FIG. 1). For example, the communication module 531 may operate in the scan mode by a processor (e.g., the processor 120 of FIG. 1). In the case where the movement (e.g., an acceleration, and/or gyro information) of the electronic device 101 measured by the sensor module 176 is not smaller than a specified range, the processor 120 may transmit a signal for operating in the scan mode to the communication module 531. According to an embodiment, the communication module 531 may operate in the scan mode before performing communication.

According to an embodiment, in the scan mode, the communication module 531 may transmit, through the RF chain 540-1, 540-2 . . . and/or 540-N, a signal having a phase and/or a strength different from a phase and/or a strength of a signal used for communication with an external electronic device (e.g., a base station or another user device). For example, the signal transmitted in the scan mode may be a signal having a phase of a specified range and/or a strength of a specified range. For example, the communication module 531 may transmit a signal having a specified strength and/or a specified phase with regard to the scan mode, using an amplifier (e.g., 547-1, 547-2 . . . and/or 547-N) and/or a phase shifter (e.g., the phase shifter 649 of FIG. 6) associated with a transmit RF chain.

According to an embodiment, in the scan mode, the communication module 531 may set at least one RF chain 540-1, 540-2 . . . and/or 540-N to a transmit RF chain and may set at least one RF chain 540-1, 540-2 . . . and/or 540-N to a receive RF chain. For example, the communication module 531 may transmit a signal through a transmit RF chain and may detect a blockage based at least partially on a strength and/or a phase of a signal (e.g., a signal induced by the transmit signal) received through a receive RF chain. For example, the communication module 531 may set a receive RF chain to a strength and/or a phase with regard to the scan mode, using an amplifier (e.g., 545-1, 545-2 . . . and/or 545-N) and/or a phase shifter (e.g., the phase shifter 646 of FIG. 6) associated with the receive RF chain. For example, unlike a normal communication mode, the communication module 531 may increase the degree to which a received power is amplified, for the purpose of increasing sensitivity of a received signal in the scan mode.

Figure 7:
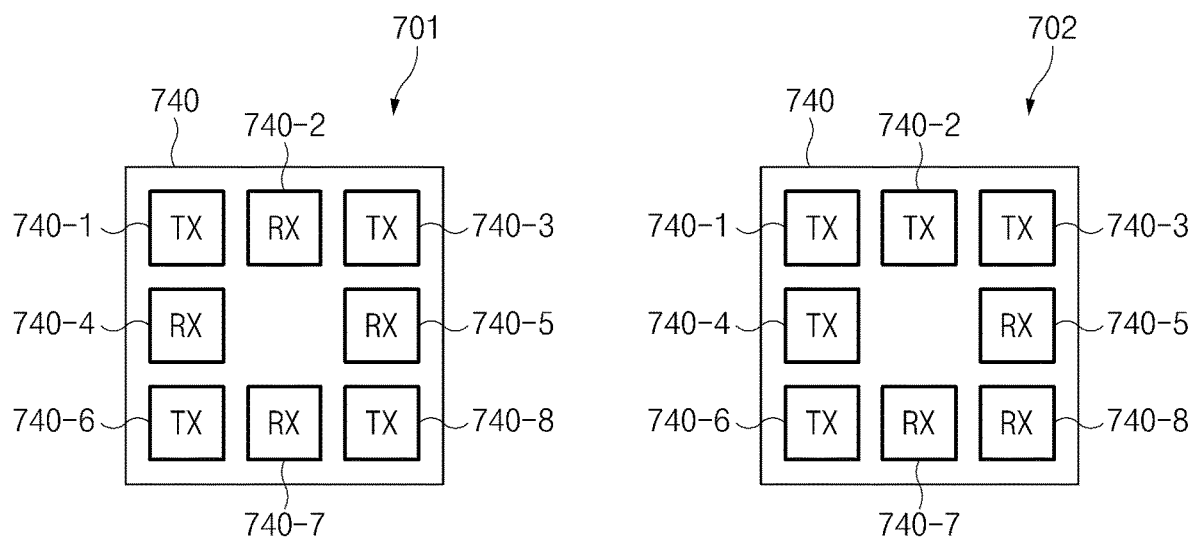
FIG. 7 is a diagram illustrating examples of transmit/receive settings of an antenna array according to an embodiment.

FIG. 7 is a diagram illustrating examples of transmit/receive settings of an antenna array according to an embodiment.

In FIG. 7, an antenna array 740 (e.g., the first antenna array 340 of FIG. 3) according to an embodiment may include eight antenna elements 740-1 to 740-8. According to an embodiment, a communication module (e.g., the communication module 531 of FIG. 5) may set at least some antenna elements to a transmit antenna element, and may set at least some antenna elements to a receive antenna element. According to an embodiment, the communication module 531 may transmit a signal through a transmit antenna element, and may receive a signal through a receive antenna element at the same time. For example, a signal which is induced (or reflected) by the signal transmitted through the transmit antenna element may be received through the receive antenna element. A layout of the antenna array 740 illustrated in FIG. 7 is provided by way of example, and the layout of the antenna array 740 is not limited thereto.

Referring to first transmit/receive settings 701, according to an embodiment, the communication module 531 may set first antenna elements (e.g., 740-1, 740-3, 740-6, and 740-8) to a transmit antenna element, and may set second antenna elements (e.g., 740-2, 740-4, 740-5, and 740-7) to a receive antenna element. In the first transmit/receive settings 701, for example, the communication module 531 may set a first antenna element and a second antenna element such that each of first antenna elements is adjacent to each of second antenna elements, the number of which is identical to the number of the first antenna elements. According to an embodiment, the communication module 531 may set the first antenna element and the second antenna element such that the first antenna element and the second antenna element are alternately positioned in the antenna array 740. For example, the communication module 531 may alternately set the first antenna element and the second antenna element in a row and/or a column of the antenna array 740.

Referring to second transmit/receive settings 702, according to an embodiment, the communication module 531 may set first antenna elements (e.g., 740-1, 740-2, 740-3, 740-4, and 740-6) to a transmit antenna element, and may set second antenna elements (e.g., 740-5, 740-7, and 740-8) to a receive antenna element. In the second transmit/receive settings 702, for example, the communication module 531 may set a first antenna element and a second antenna element such that first antenna elements are positioned adjacent to each other and second antenna elements are positioned adjacent to each other. For example, the communication module 531 may increase a transmit gain by setting first antenna elements so as to be adjacent to each other.

Figure 8:
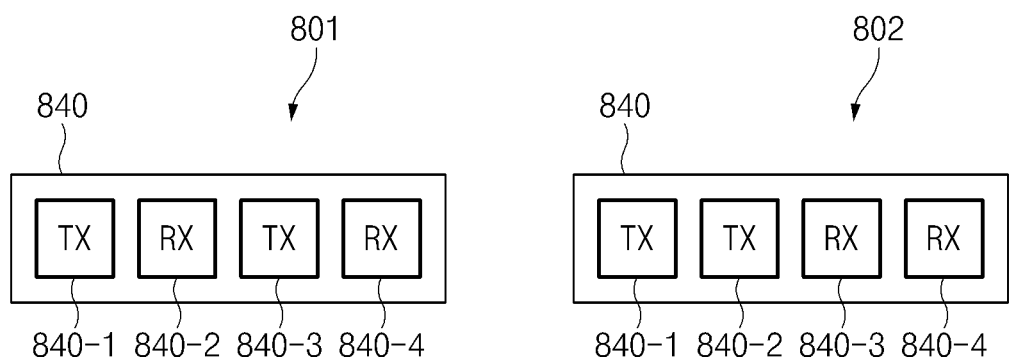
FIG. 8 is a diagram illustrating examples of transmit/receive settings of an antenna array according to another embodiment.

FIG. 8 is a diagram illustrating examples of transmit/receive settings of an antenna array according to another embodiment.

In FIG. 8, an antenna array 840 (e.g., the first antenna array 340 or the second antenna array 345 of FIG. 3) according to an embodiment may include four antenna elements 840-1, 840-2, 840-3, and 840-4. According to an embodiment, a communication module (e.g., the communication module 531 of FIG. 5) may set at least some antenna elements to a transmit antenna element, and may set at least some antenna elements to a receive antenna element. A layout of the antenna array 840 illustrated in FIG. 8 is provided by way of example, and the layout of the antenna array 840 is not limited thereto.

Referring to third transmit/receive settings 801, according to an embodiment, the communication module 531 may set first antenna elements (e.g., 840-1 and 840-3) to a transmit antenna element, and may set second antenna elements (e.g., 840-2 and 840-4) to a receive antenna element. In the third transmit/receive settings 801, for example, the communication module 531 may alternately set a first antenna element and a second antenna element.

Referring to fourth transmit/receive settings 802, according to an embodiment, the communication module 531 may set first antenna elements (e.g., 840-1 and 840-2) to a transmit antenna element, and may set second antenna elements (e.g., 840-3 and 840-4) to a receive antenna element. In the fourth transmit/receive settings 802, for example, the communication module 531 may set a first antenna element and a second antenna element such that first antenna elements are positioned adjacent to each other and second antenna elements are positioned adjacent to each other. For example, the communication module 531 may increase a transmit gain by setting first antenna elements so as to be adjacent to each other.

Figure 9:
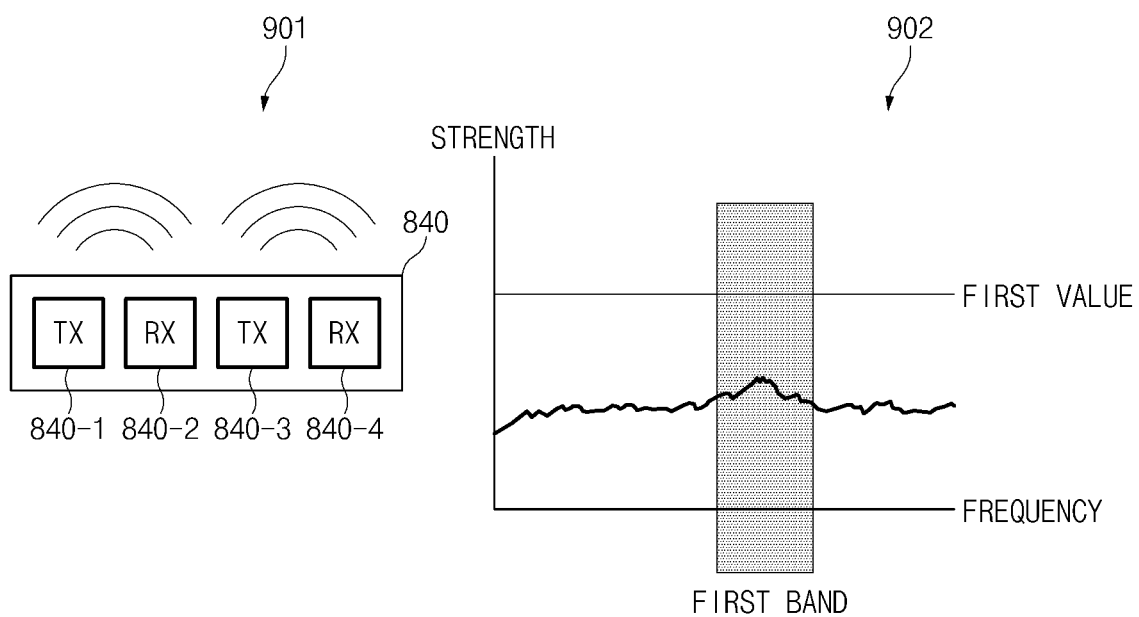
FIG. 9 is a diagram illustrating a blockage detection situation in open-air according to an embodiment.

FIG. 9 is a diagram illustrating a blockage detection situation in open-air according to an embodiment.

Referring to reference numeral 902 of FIG. 9, according to an embodiment, the antenna array 840 may be set according to the third transmit/receive settings 901 (e.g., 801 of FIG. 8). A communication module 531 (e.g., the communication module 531 of FIG. 5) may transmit a signal (e.g., a reference signal) through the first antenna elements 840-1 and 840-3, and may receive or sense a signal (e.g., a reflected signal) induced from the transmit signal using the second antenna elements 840-2 and 840-4.

Referring to reference numeral 902 of FIG. 9, according to an embodiment, it is assumed that the antenna array 840 is not blocked. Since a reflected signal is not induced due to a blockage, as illustrated in FIG. 9, a strength of a signal received through the second antenna elements 840-2 and 840-4 may be smaller than a specified value (e.g., a first value). According to an embodiment, in the case where a strength of an induced signal (e.g., a reflected signal) is smaller than the specified value, the communication module 531 may determine that the antenna array 840 or the first antenna elements 840-1 and 840-3 are not blocked.

According to an embodiment, the communication module 531 may determine whether a blockage occurs, by sensing a strength of a signal in a specified band (e.g., a first band). For example, the first band may include a frequency of a signal transmitted through the first antenna elements 840-1 and 840-3, or may correspond to at least a portion of a band associated with the frequency of the transmitted signal. For example, the first band may, for example, be at least a portion of a frequency band ranging from 3 GHz to 300 GHz.

Figure 10:
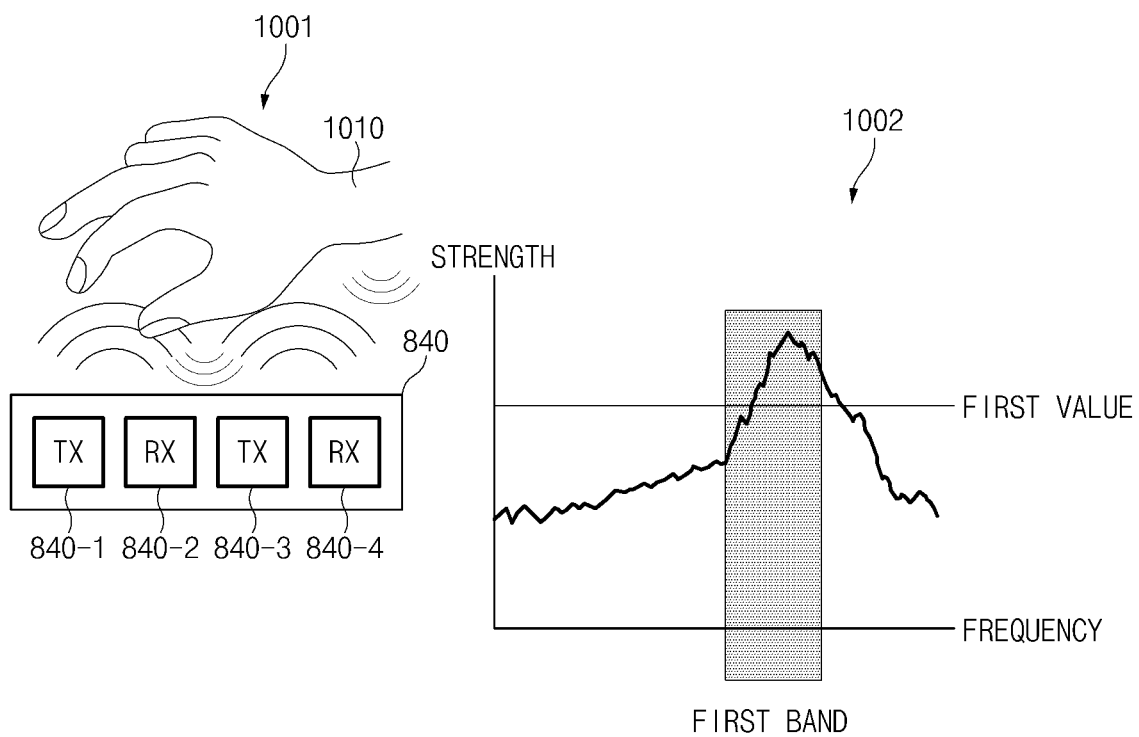
FIG. 10 is a diagram illustrating a blockage detection situation in a blockage situation according to an embodiment.

FIG. 10 is a diagram illustrating a blockage detection situation in a blockage situation according to an embodiment.

Referring to reference numeral 1001 of FIG. 10, according to an embodiment, the antenna array 840 may be set according to the third transmit/receive settings 801 of FIG. 8. A communication module (e.g., the communication module 531 of FIG. 5) may transmit a signal (e.g., a reference signal) through the first antenna elements 840-1 and 840-3, and may receive or sense a signal (e.g., a reflected signal) induced from the transmit signal using the second antenna elements 840-2 and 840-4.

According to an embodiment, the antenna array 840 may be blocked by a blockage. For example, a signal transmitted through the first antenna elements 840-1 and 840-3 may be reflected by a hand 1010 of a user. For example, the reflected signal may be received or sensed by the second antenna elements 840-2 and 840-4. According to an embodiment, a strength of the signal received or sensed through the second antenna elements 840-2 and 840-4 may be not smaller than the specified value (e.g., the first value) 1002. According to an embodiment, in the case where a strength of an induced signal (e.g., a reflected signal) is not smaller than the specified value, the communication module 531 may determine that at least a portion of the antenna array 840 or the first antenna elements 840-1 and 840-3 is blocked.

According to an embodiment, the communication module 531 may determine whether a blockage occurs, by sensing a strength of a signal in a specified band (e.g., the first band). For example, the first band may include a frequency of a signal transmitted through the first antenna elements 840-1 and 840-3, or may correspond to at least a portion of a band associated with the frequency of the transmitted signal. For example, the first band may be at least a portion of a frequency band ranging from 3 GHz to 300 GHz.

In the embodiments of FIGS. 9 and 10, the first antenna elements 840-1 and 840-3 of the antenna array 840 may be set to a transmit antenna element, and the second antenna elements 840-2 and 840-4 may be set to a receive antenna element. However, a layout of an antenna array and settings of transmit/receive antenna elements are not limited to those of FIGS. 9 and 10.

In the example embodiments illustrated in FIGS. 7, 8, 9, and 10, at least some antenna elements may be set to a transmit antenna element, and at least some antenna elements may be set to a receive antenna element. According to an embodiment, in the case where all antenna elements are set to the same purpose (e.g., transmission or reception), a communication module (e.g., the communication module 531 of FIG. 5) may change the settings of at least some antenna elements. Below, a method which may detect a blockage without changing settings of antenna elements according to various embodiments will be described with reference to FIG. 11.

Returning to FIG. 5A, according to various embodiments, the communication module 531 may set all RF chains (e.g., the RF chains 541-1, 541-2 . . . and 541-N of FIG. 5A) to a transmit RF chain. For example, the communication module 531 may detect a blockage without changing settings of RF chains in the scan mode. According to an embodiment, the communication module 531 may transmit a signal using at least one transmit RF chain and may verify a strength of a signal induced in at least one transmit RF chain which is not used to transmit the signal. For example, the transmit RF chain which is not used to transmit a signal may be set to an off state. According to an embodiment, the communication module 531 may detect whether at least some antenna elements are blocked, based at least on the strength of the signal induced in the at least one transmit RF chain.

Figure 11:
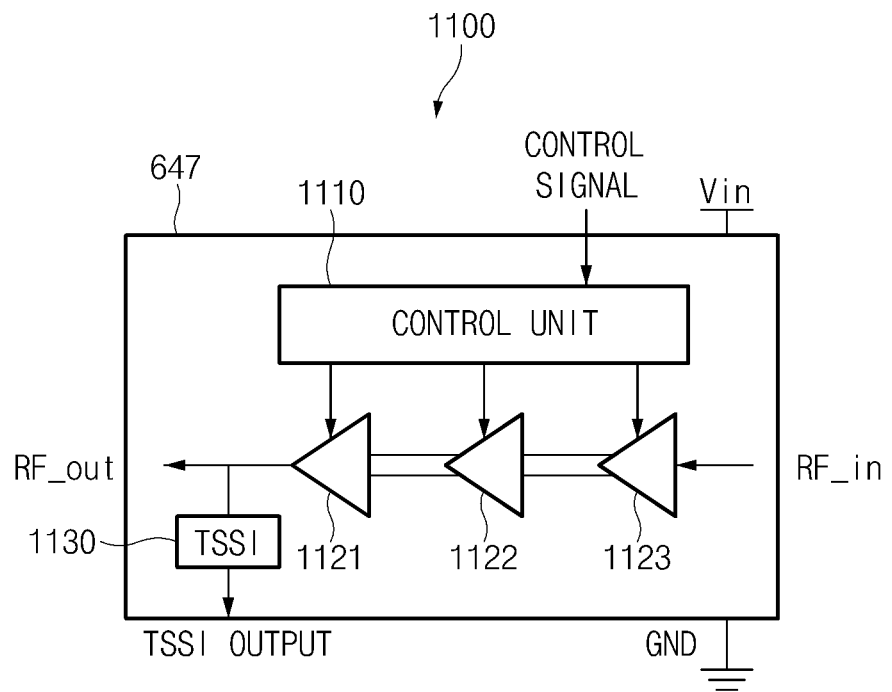
FIG. 11 is a diagram illustrating a structure of a power amplifier according to various embodiments.

FIG. 11 is a diagram illustrating a structure 1100 of the power amplifier 647 according to various embodiments.

Referring to FIGS. 5 and 11, according to various embodiments, the power amplifier 647 (e.g., the power amplifier 647) positioned on a transmit path of an RF chain may include a control unit (e.g., including control circuitry) 1110, a transmitted signal strength indicator (TSSI) module (e.g., including signal strength indicator circuitry) 1130, a first power amplifier 1121, a second power amplifier 1122, and a third power amplifier 1123. According to an embodiment, the control unit 1110 may control the first power amplifier 1121, the second power amplifier 1122, and the third power amplifier 1123 based on a control signal received from the outside. According to an embodiment, the TSSI module 1130 may include various circuitry and sense a magnitude of a signal output from the power amplifier 647.

According to an embodiment, the TSSI module 1130 may sense a magnitude of a signal induced in a transmit RF chain associated with the TSSI module 1130 due to a signal transmitted from another RF chain (e.g., the RF chain 540-1, 540-2 . . . and/or 540-N FIG. 5A), as well as a magnitude of a signal output from the power amplifier 647. According to an embodiment, the communication module 531 may detect a blockage of at least one RF chain 540-1, 540-2 . . . and/or 540-N based at least on the magnitude (e.g., a TSSI magnitude) of the induced signal sensed by the TSSI module 1130. For example, in the case where the magnitude of the induced signal sensed by the TSSI module 1130 is not smaller than a specified range, the communication module 531 may determine that at least one RF chain 540-1, 540-2 . . . and/or 540-N is blocked. According to an embodiment, the communication module 531 may detect a blockage of at least one RF chain 540-1, 540-2 . . . and/or 540-N based at least on the magnitude (e.g., a TSSI magnitude) of the induced signal sensed by the TSSI module 1130 and a magnitude of the transmit signal. For example, in the case where a difference between the magnitude of the induced signal sensed by the TSSI module 1130 and the magnitude of the transmit signal is smaller than the specified range, the communication module 531 may determine that at least one RF chain 540-1, 540-2 . . . and/or 540-N is blocked.

For example, at least one RF chain 540-1, 540-2 . . . and/or 540-N used to transmit a reference signal may be referred to as a "first RF chain", and the remaining RF chains 540-1, 540-2 . . . and/or 540-N may be referred to as a "second RF chain". For example, the communication module 531 may set the first RF chain to a transmit RF chain, and may set the second RF chain to an off state. The second RF chain set to the off state may not be used to transmit a signal. Referring to FIG. 6, according to an embodiment, the RF chain 640 may be set to an off state, and the communication module 531 may not apply a signal to a transmit path of the RF chain 640. According to various embodiments, the communication module 531 may control a gain of at least one amplifier (e.g., the pre-power amplifier 648 and/or the amplifier 647) positioned on the transmit path of the RF chain 640 of the off state so as to be a specified value or greater, or may decrease a power to be supplied to the at least one amplifier (e.g., the pre-power amplifier 648 and/or the amplifier 647) to a specified value or smaller. For example, the communication module 531 may control a gain of the amplifier 647 by controlling a gain of the first power amplifier 1121, the second power amplifier 1122, and/or the third power amplifier 1123. According to various embodiments, the communication module 531 may control components (e.g., the pre-power amplifier 648 and/or the amplifier 647) on the RF chain of the off state such that only the TS SI module 1130 operates with regard to the RF chain of the off state.

According to an embodiment, the communication module 531 may detect a blockage based, for example, and without limitation, at least on a TSSI output obtained from a TSSI module (e.g., the TSSI module 1130) connected to a first RF chain and a TSSI output obtained from a TSSI module (e.g., the TSSI module 1130) connected to a second RF chain. For example, a value of the TSSI output which is obtained by the TSSI module (e.g., the TSSI module 1130) connected to the first RF chain may increase as a transmit power of the reference signal increases. For example, a value of the TSSI output which is obtained by the TSSI module (e.g., the TSSI module 1130) connected to the second RF chain may increase as a power of a signal (e.g., a reference signal reflected by a blockage) induced by a reference signal increases. According to an embodiment, in the case where a difference between the magnitude of the TSSI output associated with the second RF chain and the magnitude of the TSSI output associated with the first RF chain is smaller than a specified range, the communication module 531 may determine that at least one RF chain 540-1, 540-2 . . . and/or 540-N is blocked.

Figure 12:
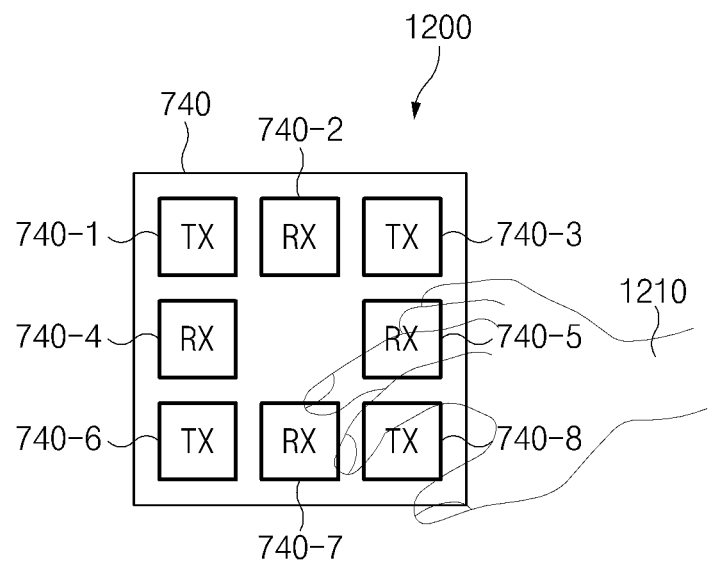
FIG. 12 is a diagram illustrating a partial blockage detection situation according to an embodiment.

FIG. 12 is a diagram illustrating a partial blockage detection situation 1200 according to an embodiment.

Referring to FIG. 12, according to an embodiment, at least a portion of antenna elements 740-1 to 740-8 of the antenna array 740 may be blocked by a blockage 1210 (e.g., a hand of a user 1210). For example, in the case where a transmit antenna element 740-8 is blocked by the blockage 1210, a signal transmitted from the transmit antenna element 740-8 may be reflected by the blockage 1210, and the reflected signal may be received or sensed through adjacent receive antenna elements 740-5 and 740-7. For example, a strength of the signal received or sensed through the receive antenna elements 740-5 and 740-7 may be not smaller than a specified range.

According to an embodiment, a communication module (e.g., the communication module 250 of FIG. 2) may detect a blocked antenna element (e.g., 740-8) based on locations of the antenna elements (e.g., 740-5 and 740-7) through which the signal having the strength of the specified range or greater is received/sensed. For example, the communication module 250 may determine that the transmit antenna elements (e.g., 740-8, 740-6, and/or 740-3) adjacent to the antenna elements (e.g., 740-5 and 740-7) through which the signal having the strength of the specified range or greater is received/sensed are blocked. For another example, the communication module 250 may determine that the transmit antenna elements (e.g., 740-8, 740-6, and/or 740-3) adjacent to the antenna element (e.g., 740-5 or 740-7) through which the signal having the strength of the specified range or greater is received/sensed and the antenna element (e.g., 740-5 or 740-7) through which the signal having the strength of the specified range or greater is received/sensed are blocked.

In the embodiments described with reference to FIGS. 7 to 12, a communication module (e.g., the communication module 250 of FIG. 2) may detect a blockage based at least on a strength of a signal. According to an embodiment, the communication module 250 may detect a blockage based at least on a phase difference between a transmit signal and a receive signal and a received signal strength. For example, the communication module 250 may obtain a phase difference between a transmit signal and a receive signal (e.g., an induced signal) using a transceiver included in the communication module 250.

According to an embodiment, the communication module 250 may detect a blockage based on in-phase and quadrature phase (IQ) information between the transmit signal and the receive signal (e.g., an induced signal). For example, the communication module 250 may track a magnitude of an impedance of an associated antenna array and a phase between a transmit signal and a receive signal by comparing the IQ information between the transmit signal and the receive signal. The communication module 250 may obtain a standing wave ratio (SWR) of an antenna array based on the IQ information. According to an embodiment, the communication module 250 may detect a blockage based on load impedance mismatching of an antenna array, which is detected based on a transmit signal and a receive signal.

Figure 13:
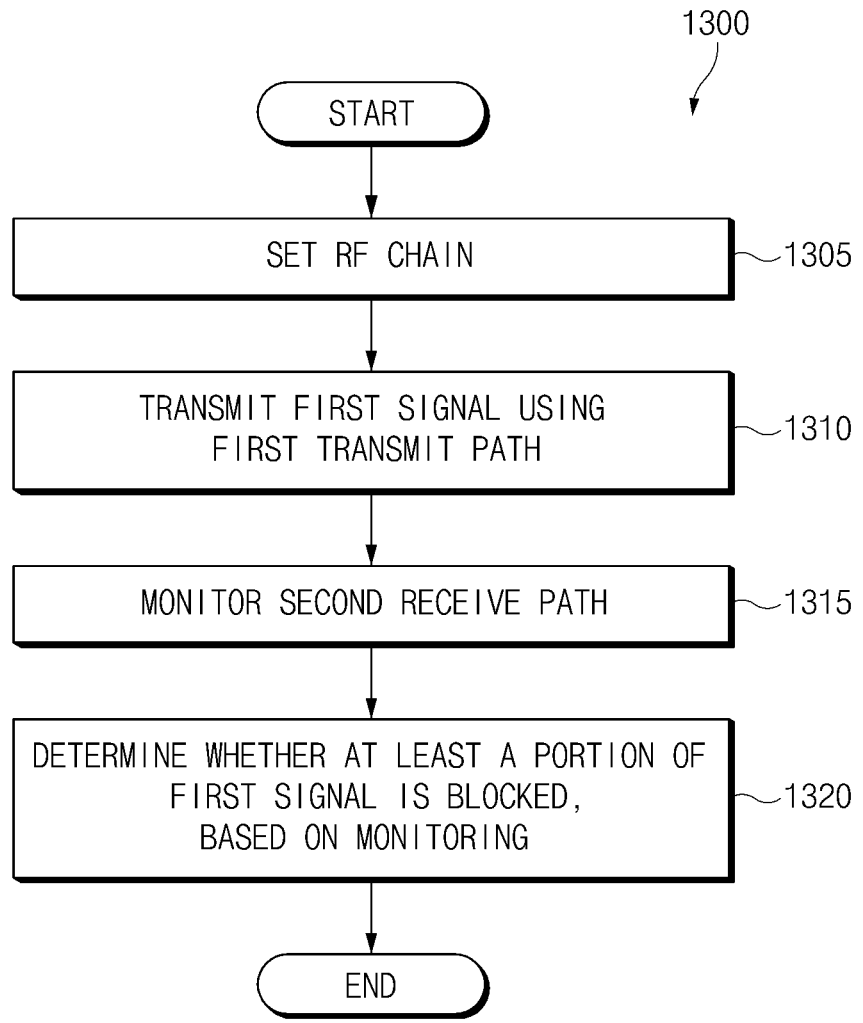
FIG. 13 is a flowchart illustrating a blockage detecting method according to various embodiments.

FIG. 13 is a flowchart 1300 illustrating a blockage detecting method according to various embodiments.

In operation 1305, according to various embodiments, the communication module 250 of the electronic device 101 may set an RF chain (e.g., the RF chain 540-1, 540-2 . . . or 540-N of FIG. 5). For example, the communication module 250 may set at least a portion of the RF chains 540-1, 540-2 . . . and 540-N to a transmit RF chain and may set at least a portion of the RF chains 540-1, 540-2 . . . and 540-N to a receive RF chain. For another example, the communication module 250 may set all the RF chains 540-1, 540-2 . . . and 540-N to a transmit RF chain. For another example, the communication module 250 may set all the RF chains 540-1, 540-2 . . . and 540-N to a transmit RF chain, may use some transmit RF chains for the purpose of transmitting a signal, and may set the remaining transmit RF chains to an off state. According to an embodiment, the communication module 250 may set the RF chain 540-1, 540-2 . . . or 540-N based on a specified condition (e.g., a communication start, a movement, which is not smaller than a specified range, of the electronic device 200, the quality of communication of a specified range or smaller, or a specified period), in operation 1305.

According to various embodiments, in operation 1310, the communication module 250 may transmit a first signal using a first transmit path of the RF chain set to the transmit RF chain. For example, the first signal may be different from a signal used for general communication in magnitude and/or phase.

According to various embodiments, in operation 1315, the communication module 250 may monitor a second receive path. For example, the second receive path may include at least a part of the remaining RF chains except for the RF chain used to transmit the first signal in operation 1310. For example, the remaining RF chains may be a receive RF chain or a transmit RF chain.

According to an embodiment, the communication module 250 may monitor a magnitude and/or a phase of a signal received or sensed through a receive RF chain. According to an embodiment, the communication module 250 may monitor a magnitude of a signal applied to or sensed from a transmit RF chain.

According to various embodiments, in operation 1320, the communication module 250 may determine whether at least a portion of the first signal is blocked, based on the monitoring. For example, in the case where the magnitude of the received or sensed signal is not smaller than a specified range, the communication module 250 may determine that at least a portion of the first signal is blocked.

Figure 14:
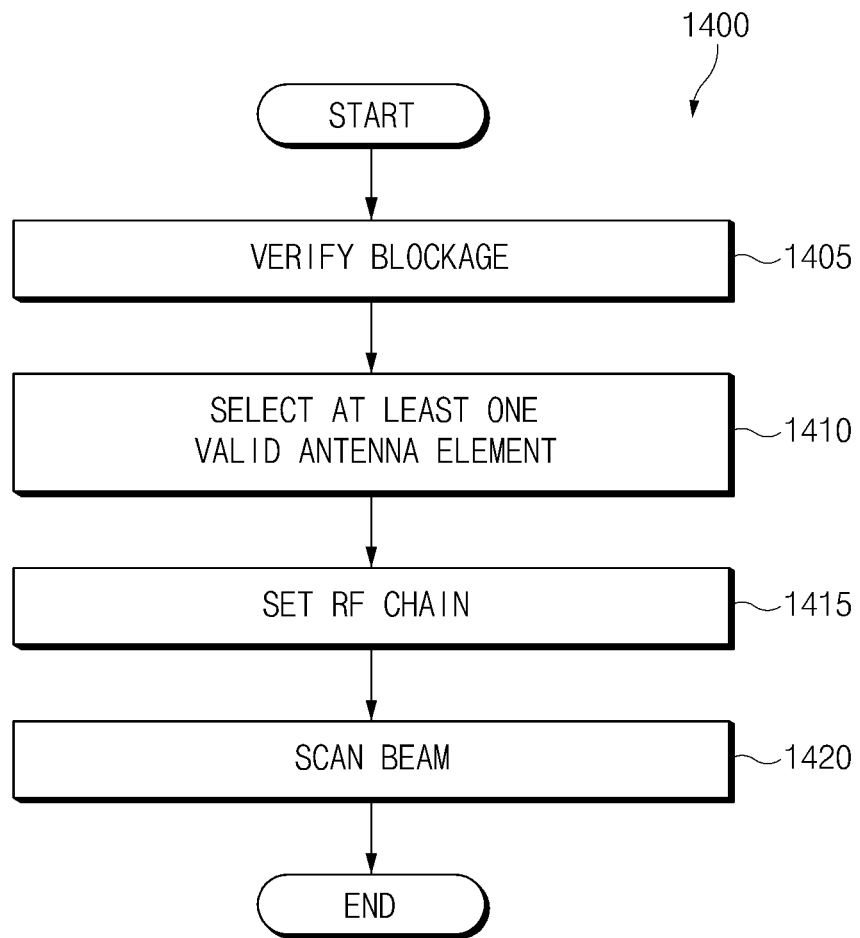
FIG. 14 is a flowchart illustrating a beam scanning method according to an embodiment.

FIG. 14 is a flowchart 1400 illustrating a beam scanning method according to an embodiment.

According to various embodiments, in operation 1405, a communication module (e.g., the communication module 250 of FIG. 2) may determine whether at least a portion of an antenna array (e.g., the first antenna array 340 or the second antenna array 345 of FIG. 3) is blocked. For example, the communication module 250 may verify the blockage depending on the blockage detecting method of FIG. 13.

According to various embodiments, in operation 1410, the communication module 250 may select at least one valid antenna element based at least on the verified blockage. For example, the communication module 250 may select, as a valid antenna element, an antenna element except for an antenna element determined as a blocked antenna element.

According to various embodiments, in operation 1415, the communication module 250 may set an RF chain (e.g., the RF chain 540-1, 540-2 . . . or 540-N of FIG. 5) based on the valid antenna element thus selected. For example, the communication module 250 may set the selected valid antenna element to a transmit RF chain.

According to various embodiments, in operation 1420, the communication module 250 may perform beam scanning based on the setting of the RF chain. For example, the communication module 250 may perform the beam scanning using only the valid antenna element, thus reducing power consumption in the beam scanning and a time taken to perform the beam scanning.

For example, the communication module 250 may obtain IQ information between a transmit signal and a receive signal, in operation 1405. According to an embodiment, the communication module 250 may perform the beam scanning using the valid antenna element, based on the obtained IQ information (e.g., obtained phase and/or magnitude information).

For example, the communication module 250 may perform the beam scanning using an antenna element associated with a part of directions associated with the electronic device 101 or a communication device (e.g., 221, 222, 223, and/or 224), in operation 1405. For example, the communication module 250 may perform the beam scanning only on at least one direction (e.g., a direction associated with valid antenna elements, the number of which is not smaller than a specified value) determined as being not blocked.

Figure 15:
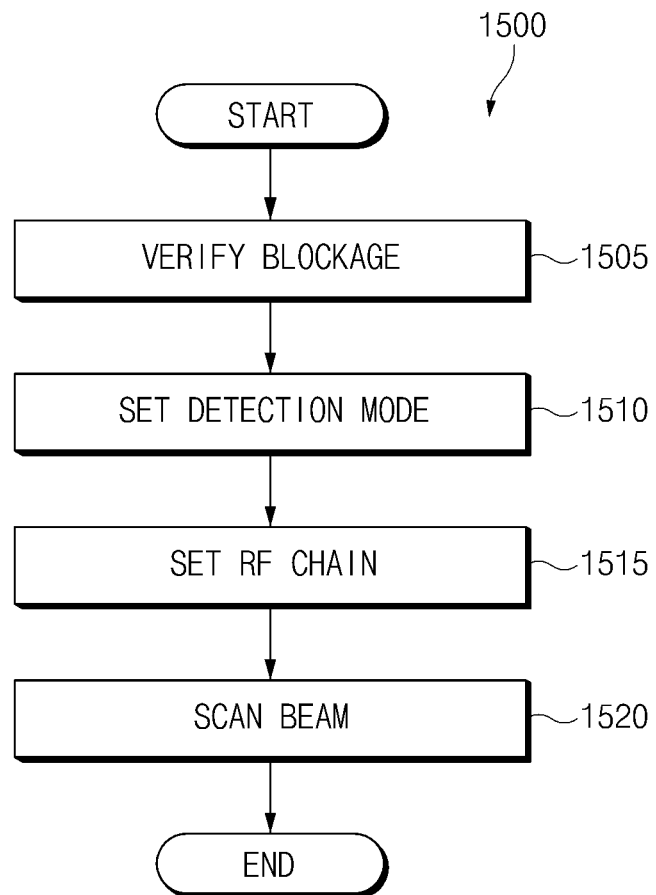
FIG. 15 is a flowchart illustrating a beam scanning method according to another embodiment.

FIG. 15 is a flowchart 1500 illustrating a beam scanning method according to another embodiment.

According to various embodiments, in operation 1505, the communication module 250 may determine whether at least a portion of an antenna array (e.g., the first antenna array 340 or the second antenna array 345 of FIG. 3) is blocked. For example, the communication module 250 may verify the blockage depending on the blockage detecting method of FIG. 13.

According to various embodiments, in operation 1510, the communication module 250 may set a detection mode based at least on the verified blockage. For example, the communication module 250 may set the detection mode based on the degree of blockage (e.g., the number of blocked antenna elements or a ratio of blocked antenna elements). According to an embodiment, the detection mode may include a power mode and a phase mode.

According to an embodiment, in the case where the degree of blockage is not smaller than a specified range, the communication module 250 may set the detection mode to the power mode. According to an embodiment, in the case where the degree of blockage is smaller than the specified range, the communication module 250 may set the detection mode to the phase mode.

According to various embodiments, in the case of the power mode, in operation 1515, the communication module 250 may set an RF chain such that a maximum power for amplification is assigned to antenna elements, each of which is not blocked. For example, the communication module 250 may amplify a signal of an RF chain targeted for beam scanning, by additionally using an amplification power of the blocked RF chain. For example, the communication module 250 may amplify a signal of an RF chain targeted for beam scanning up to a specified maximum value. According to an embodiment, in operation 1520, the communication module 250 may perform the beam scanning by assigning the maximum power for amplification to each of the remaining antenna elements except for the blocked antenna element. According to an embodiment, the communication module 250 of the power mode may not use a phase shifter (e.g., the phase shifter 646 of FIG. 6) for the beam scanning. With regard to the power mode, a configuration of RF chains according to various embodiments will be described with reference to FIGS. 20 and 21.

Figure 20:
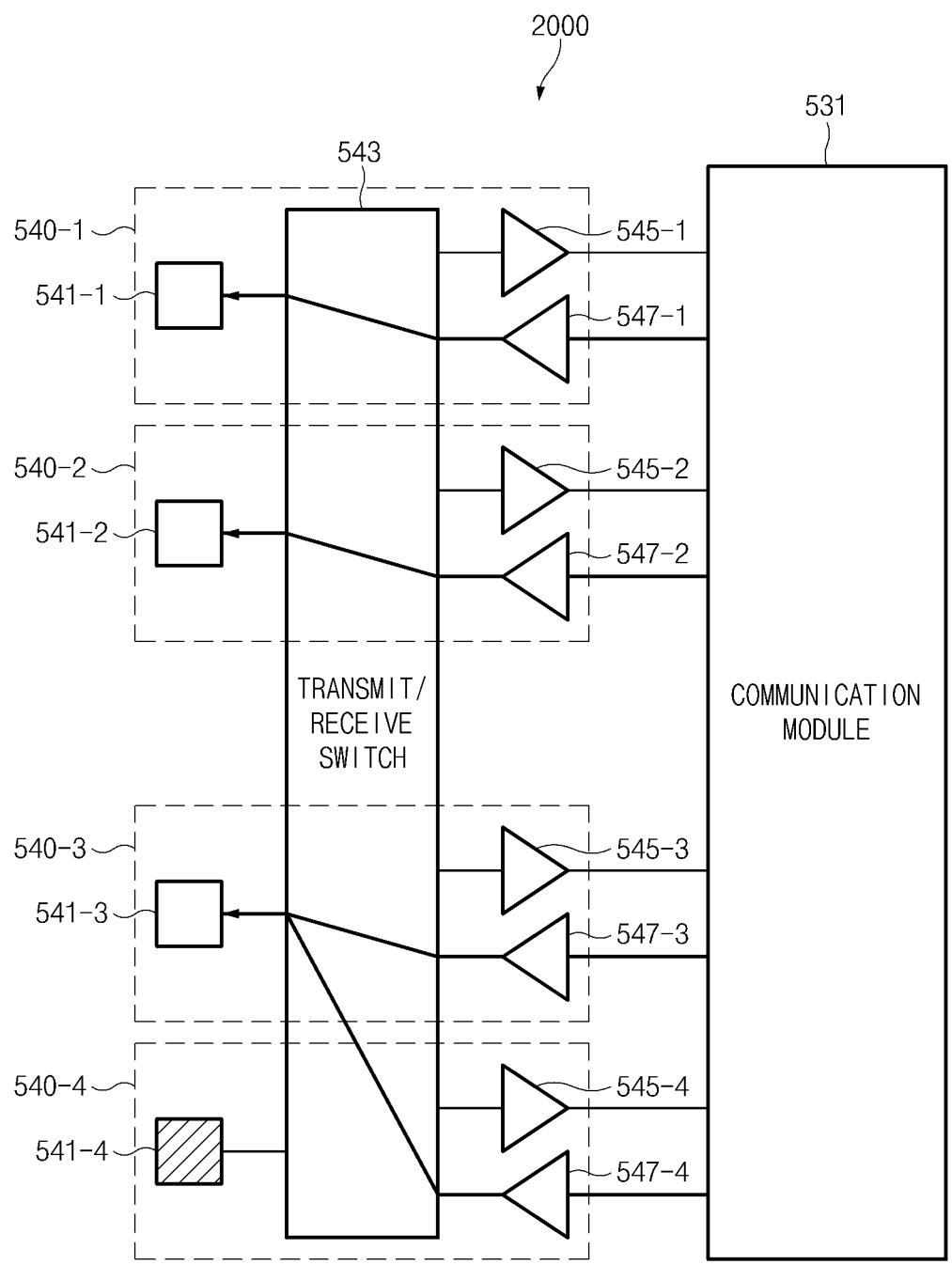
FIG. 20 is a diagram illustrating a configuration of a transmit chain according to an embodiment.

FIG. 20 is a diagram illustrating a configuration of a transmit chain according to an embodiment.

Referring to FIG. 20, a block diagram 2000 of RF chains may, for example, include the four RF chains 540-1 to 540-4. However, the number of the RF chains 540-1 to 540-4 is provided by way of example, and the communication module 531 may include a plurality of RF chains. For convenience of description, a description for components having the same reference numerals/marks as components of FIG. 5 will not be repeated to avoid redundancy. For example, it is assumed that the antenna element 541-4 is blocked, depending on a result of operation 1505.

According to an embodiment, a transmit/receive switch 543 may connect the RF chains 540-1 to 540-4 to the antenna elements 541-1 to 541-4, respectively. For example, the transmit/receive switch 543 may connect a plurality of transmit chains to one antenna element (e.g., 541-1, 541-2, 541-3, or 541-4). For example, in the case where the antenna element 541-4 is blocked, a transmit power may be amplified by connecting a transmit chain associated with the antenna element 541-4 to another antenna element 541-3 (e.g., an adjacent antenna element) and transmitting the same signal using the RF chain 540-3 and the RF chain 540-4.

Figure 21:
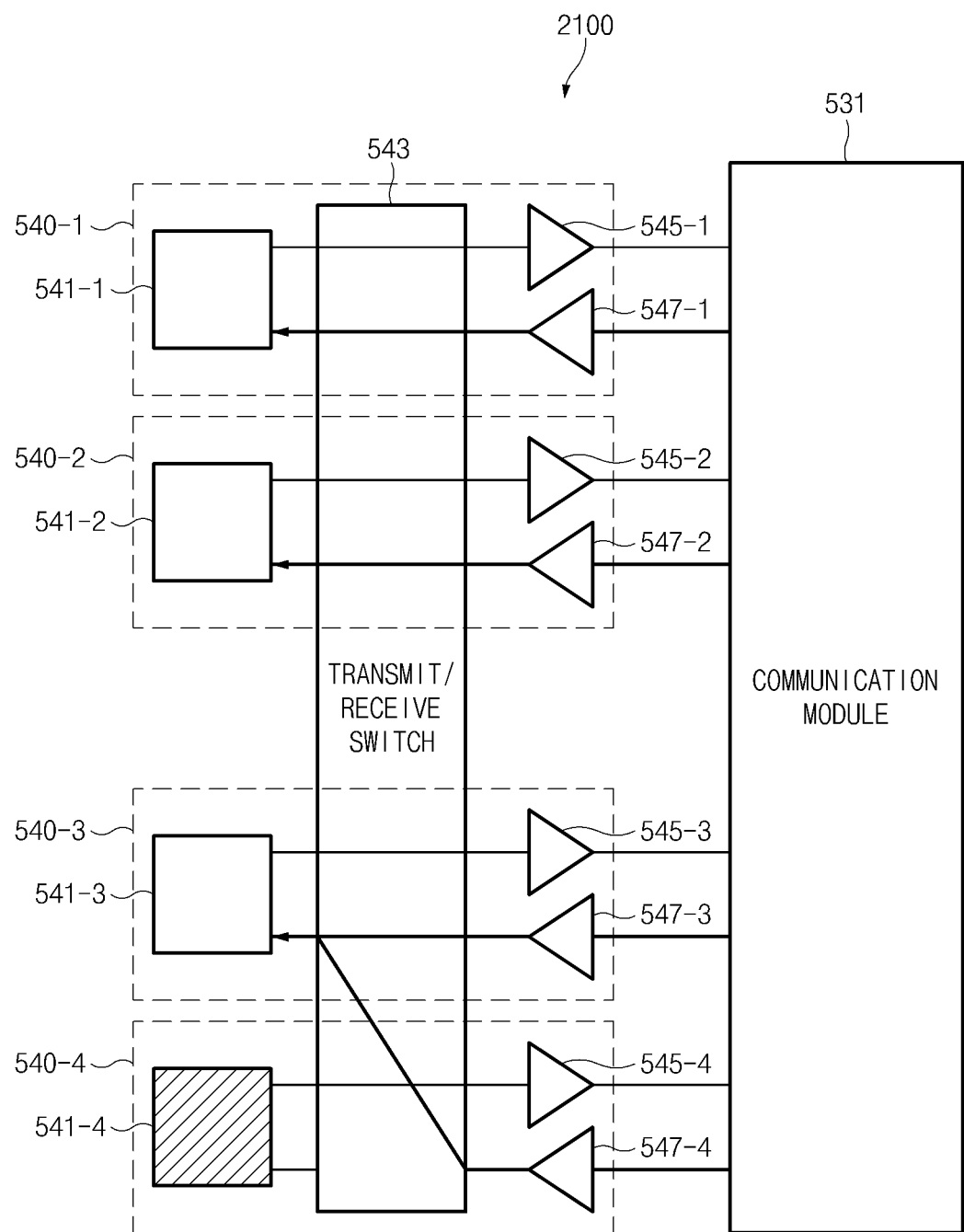
FIG. 21 is a diagram illustrating a configuration of a transmit chain according to another embodiment.

FIG. 21 is a diagram illustrating a configuration of a transmit chain according to another embodiment.

Referring to FIG. 21, a block diagram 2100 of RF chains may include the four RF chains 540-1 to 540-4. However, the number of the RF chains 540-1 to 540-4 is simply an example, and the communication module 531 may include a plurality of RF chains. For convenience of description, a description for components having the same reference numerals/marks as components of FIG. 5 will not be repeated to avoid redundancy. For example, it is assumed that the antenna element 541-4 is blocked, depending on a result of operation 1505.

According to an embodiment, each of the antenna elements 541-1 to 541-4 and a receive chain associated with each of the antenna elements 541-1 to 541-4 may be connected to each other. Each of the antenna elements 541-1 to 541-4 may be connected with a plurality of transmit chains by a transmit switch 2143.

According to an embodiment, the transmit switch 2143 may connect the transmit chains to the antenna elements 541-1 to 541-4, respectively. For example, the transmit switch 2143 may connect a plurality of transmit chains to one antenna element (e.g., 541-1, 541-2, 541-3, or 541-4). For example, in the case where the antenna element 541-4 is blocked, a transmit power may be amplified by connecting a transmit chain associated with the antenna element 541-4 to another antenna element 541-3 (e.g., an adjacent antenna element) and transmitting the same signal using the RF chain 540-3 and the RF chain 540-4.

Returning to FIG. 15, according to various embodiments, in the case of the phase mode, in operation 1515, the communication module 250 may perform the beamforming by shifting a phase of antenna elements which are not blocked. For example, in operation 1520, the communication module 250 may perform the beam scanning by measuring a strength of a receive signal using each of a plurality of beams formed in different directions.

According to various embodiments, in operation 1520, the communication module 250 may detect an optimum beam through the beam scanning. For example, the communication module 250 may determine a beam in which a strength of a receive signal is the highest, as an optimum beam.

Figure 16:
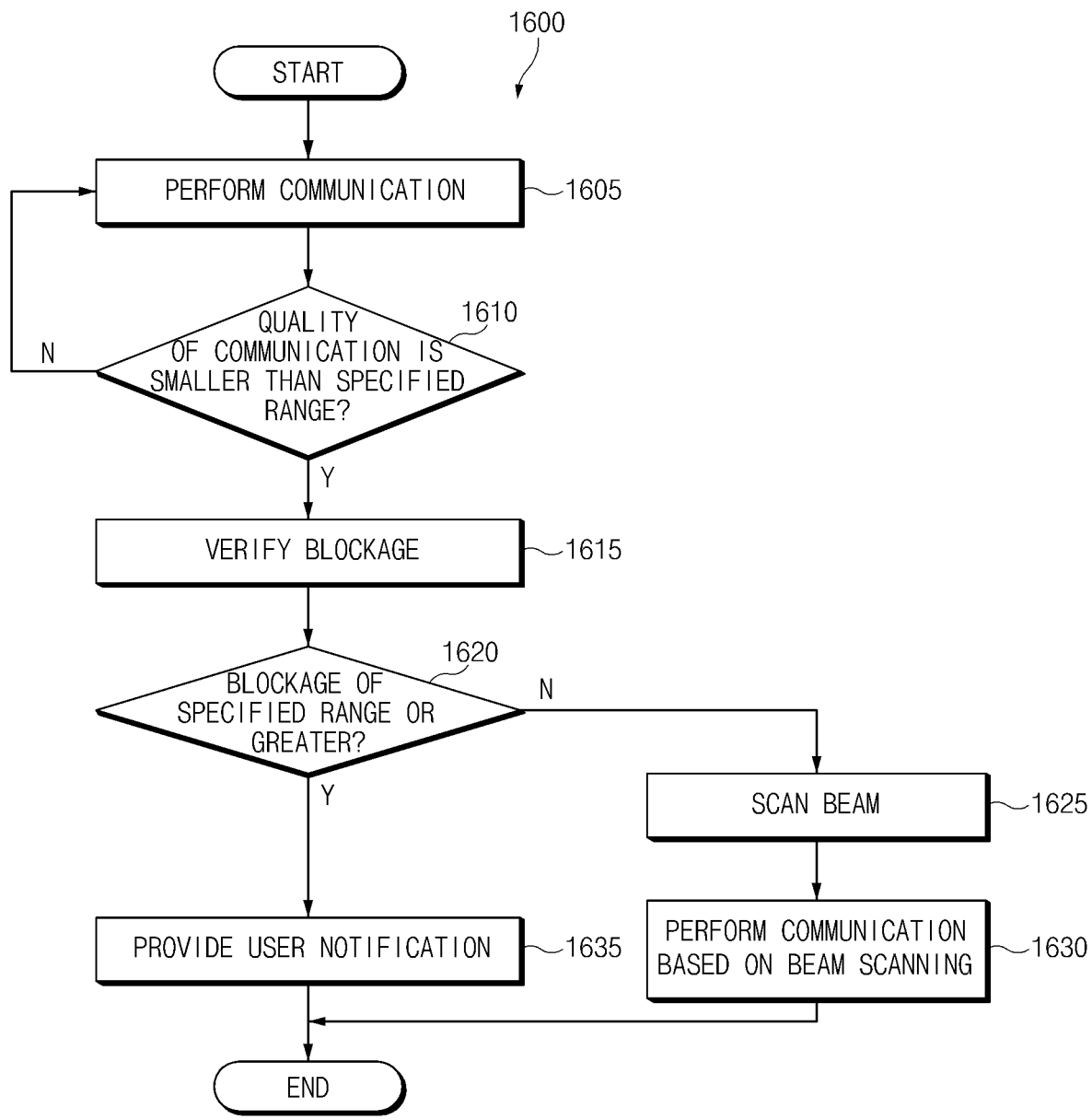
FIG. 16 is a flowchart illustrating a method of controlling an electronic device according to various embodiments.

FIG. 16 is a flowchart 1600 illustrating a method of controlling an electronic device according to various embodiments.

According to various embodiments, in operation 1605, a communication module (e.g., the communication module 250 of FIG. 2) may perform communication. For example, the communication module 250 may perform communication based on a user input or based on instructions from a processor (e.g., the processor 120 of FIG. 1).

According to various embodiments, in operation 1610, the communication module 250 may determine whether the quality of communication is smaller than a specified range, while the communication is performed. In the case where the quality of communication is not smaller than the specified range, the communication module 250 may monitor the quality of communication while continuing to perform the communication. For example, the communication module 250 may determine the quality of communication using, for example, and without limitation, data throughput, a block error rate (BLER), and/or a received power of a reference signal, or the like.

According to various embodiments, in the case where the quality of communication is smaller than the specified range, in operation 1615, the communication module 250 may verify a blockage. For example, the communication module 250 may verify the blockage using the blockage verifying method described with reference to FIG. 13.

According to various embodiments, in operation 1620, the communication module 250 may determine whether an antenna array (e.g., the first antenna array 340 or the second antenna array 345 of FIG. 3) is blocked as much as a specified range or greater. In the case where the antenna array is blocked as much as the specified range or greater, in operation 1635, the communication module 250 may provide a notification to a user. For example, the communication module 250 may provide information about a grip, which may cause or remove a blockage, through a user notification. For another example, the user notification may include information about connection loss. In the case where the antenna array is blocked as much as less than the specified range, the communication module 250 may perform the beam scanning in operation 1625 (operation 1420 of FIG. 14 or operation 1520 of FIG. 15), and may perform the communication based on a result of the beam scanning in operation 1630. According to an embodiment, the communication module 250 may perform the communication by changing at least one antenna array or changing a communication band.

According to an embodiment, the communication module 250 may provide a plurality of user notifications based on a blockage range. For example, in the case where the blockage range is smaller than a first range, the communication module 250 may warn the occurrence of a partial blockage or may provide a user notification providing information about a partial blockage. Also, in the case where the blockage range is not smaller than the first range and is smaller than a second range (e.g., the second range is not smaller than the first range), the communication module 250 may perform operation 1625 and operation 1630. According to an embodiment, in the case where the blockage range is not smaller than the second range, the communication module 250 may perform operation 1635. For example, operation 1635 may be performed when substantially the whole of an antenna array is blocked.

Figure 17:
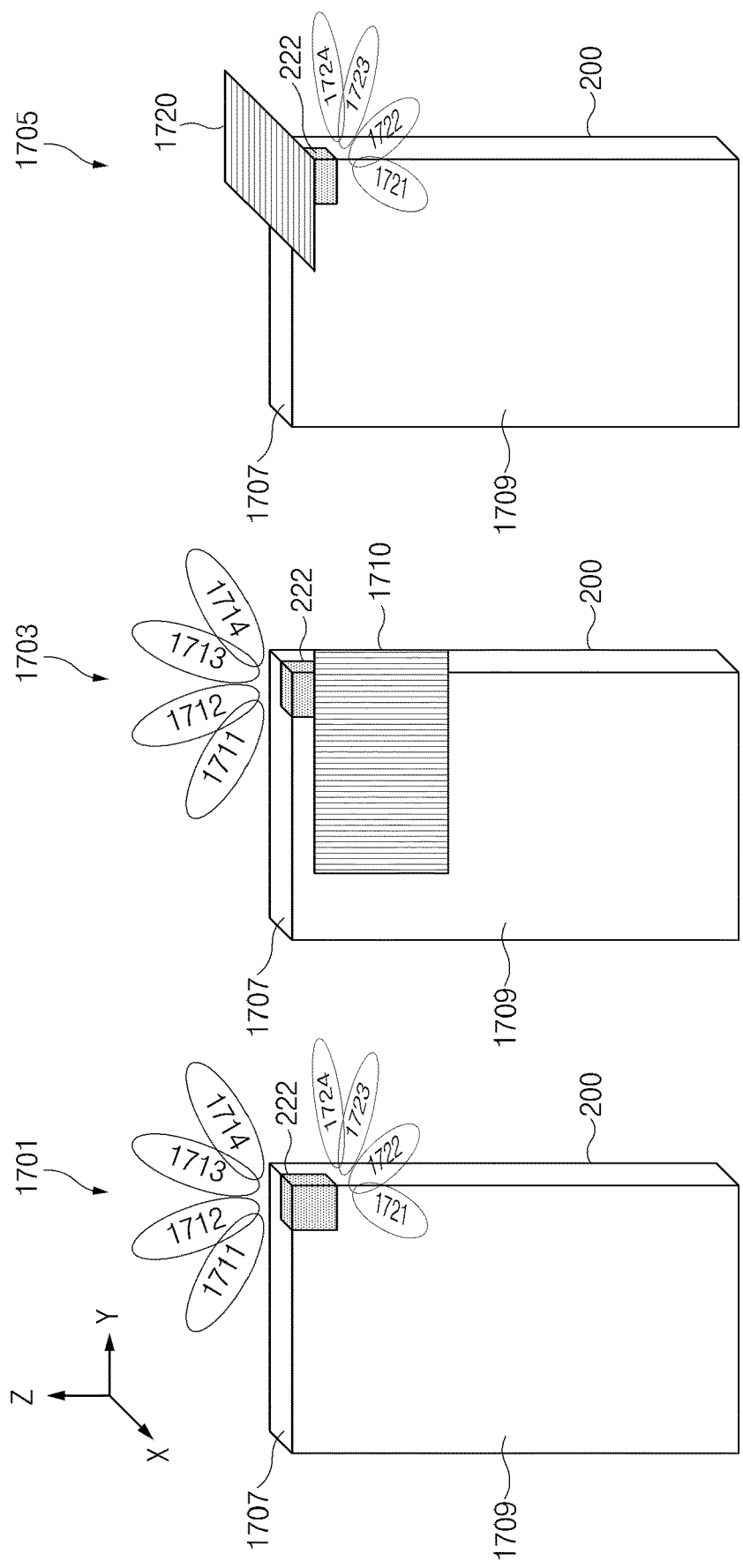
FIG. 17 is a diagram illustrating blockage situations of an electronic device according to various embodiments.

FIG. 17 is a diagram illustrating blockage situations of an electronic device according to various embodiments.

In FIG. 17, it may be assumed that a communication device (e.g., the communication device 222 of FIG. 2) is positioned within an electronic device (e.g., the electronic device 200 of FIG. 2) according to an embodiment. For example, the communication device 222 may radiate four beams 1711, 1712, 1713, and 1714 through a first surface 1707 of the electronic device 200 (e.g., a surface of the electronic device 200 perpendicular to the Z-axis), and may radiate four beams 1721, 1722, 1723, and 1724 through a second surface 1709 of the electronic device 200 (e.g., a surface of the electronic device 200 perpendicular to the X-axis). Eight beams 1711, 1712, 1713, 1714, 1721, 1722, 1723, and 1724 are illustrated in FIG. 17, but the number of beams of the communication device 222 is not limited thereto. For example, the communication device 222 may be set to radiate a plurality of beams in a plurality of directions (e.g., any direction in a three-dimensional space). Below, the eight beams 1711, 1712, 1713, 1714, 1721, 1722, 1723, and 1724 will be described with reference to FIG. 22.

Figure 22:
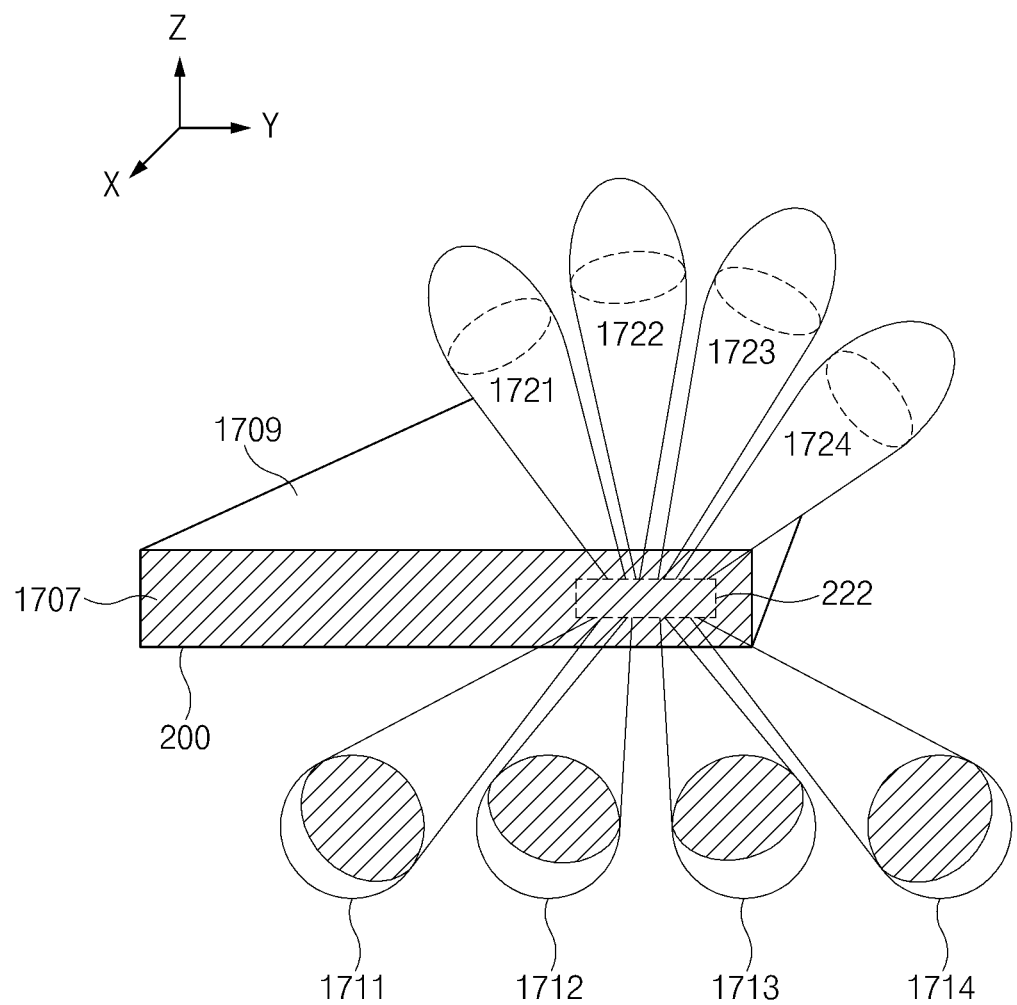
FIG. 22 is a diagram illustrating example of a beam configuration according to various embodiments.

FIG. 22 illustrates one example of a beam configuration according to various embodiments.

In FIG. 22, reference numeral 2201 is an example of reference numeral 1701 of FIG. 17 viewed in another direction. Referring to FIG. 22, the four beams 1711, 1712, 1713, and 1714 may be radiated through the first surface 1707 of the electronic device 200 (e.g., a surface of the electronic device 200 perpendicular to the Z-axis), and the four beams 1721, 1722, 1723, and 1724 may be radiated through the second surface 1709 of the electronic device 200 (e.g., a surface of the electronic device 200 perpendicular to the X-axis).

Returning to FIG. 17, according to an embodiment, in reference numeral 1701, a blockage is not detected with regard to the electronic device 200. For example, in the case where the electronic device 200 performs beam scanning, the electronic device 200 may perform the beam scanning by scanning each of the beams 1711, 1712, 1713, 1714, 1721, 1722, 1723, and 1724.

According to an embodiment, in reference numeral 1703, a blockage 1710 (e.g., at least a portion of the body of the user or any object) may be detected with regard to the second surface 1709 of the electronic device 200. For example, the electronic device 200 may perform the beam scanning using the beams 1711, 1712, 1713, and 1714 which are not blocked.

According to an embodiment, in reference numeral 1705, a blockage 1720 (e.g., at least a portion of the body of the user or any object) may be detected with regard to the first surface 1707 of the electronic device 200. For example, the electronic device 200 may perform the beam scanning using the beams 1721, 1722, 1723, and 1724 which are not blocked.

According to an embodiment, the beams 1711, 1712, 1713, and 1714 formed through the first surface 1707 and the beams 1721, 1722, 1723, and 1724 formed through the second surface 1709 may have different frequencies. For example, in the case where one surface (e.g., the first surface 1707) is blocked, the communication module 250 may perform communication using a frequency corresponding to beams formed through the remaining surface (e.g., the second surface 1709) which is not blocked. For example, the communication module 250 may perform handover for the purpose of changing a communication frequency depending on the beam change.

A beam shape and a beam configuration described with reference to FIGS. 17 and 22 are an example for description, and a beam shape and a beam configuration of the present disclosure are not limited thereto. For example, a plurality of beams may be formed to have a plurality of vertically oriented tilt angles with respect to a plane of an antenna array (e.g., the first antenna array 340 of FIG. 4) in one antenna.

Figure 23:
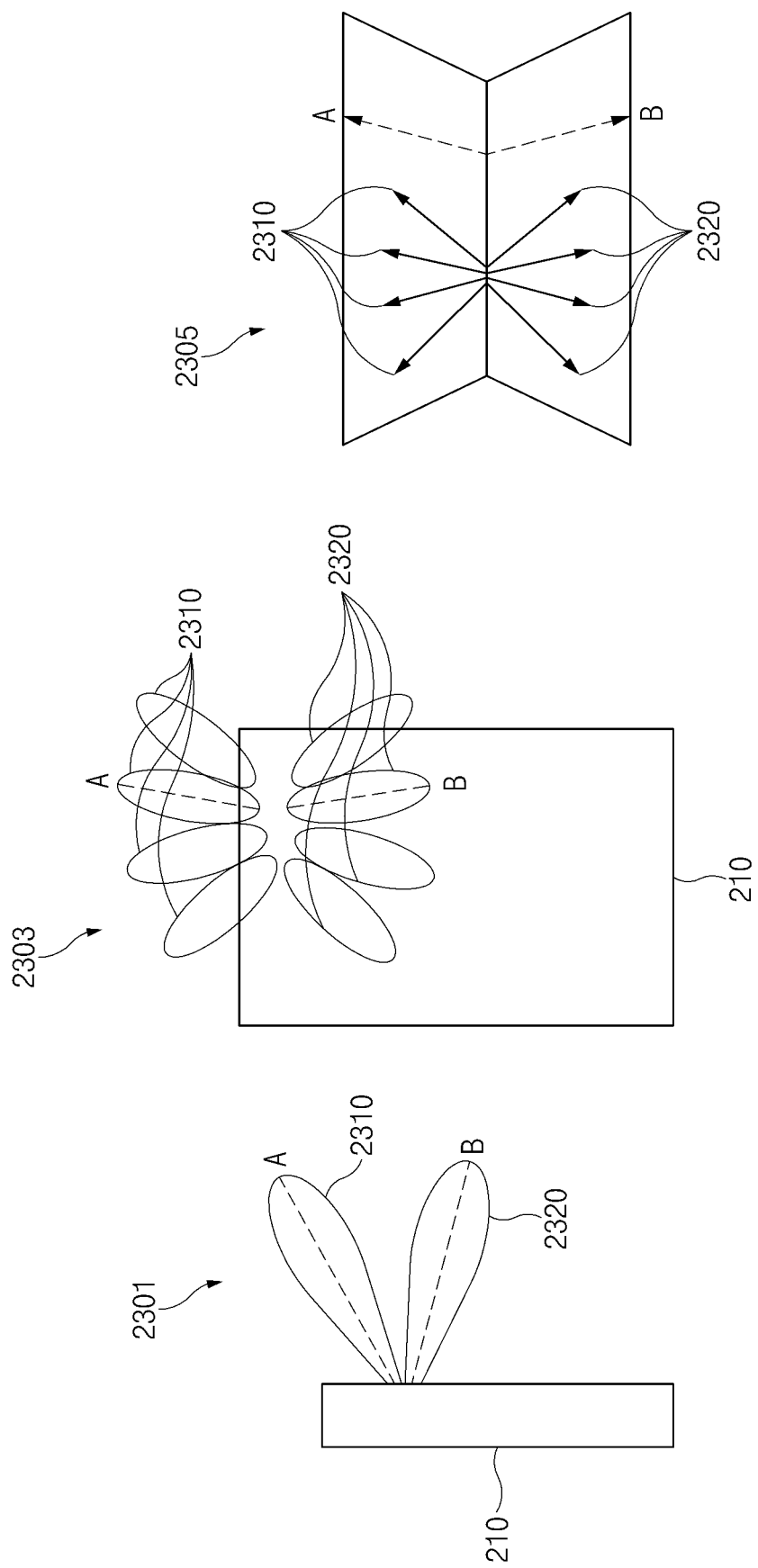
FIG. 23 is a diagram illustrating another example of a beam configuration according to various embodiments.

FIG. 23 is a diagram illustrating another example of a beam configuration according to various embodiments.

Referring to reference numeral 2301 of FIG. 23, according to an embodiment, a first beam group 2310 and a second beam group 2320 tilt in different vertical directions with respect to one surface of the housing 210 of an electronic device (e.g., the electronic device 200 of FIG. 2) may be formed. For example, the first beam group 2310 may be beamformed with respect to direction "A", and the second beam group 2320 may be beamformed with respect to direction "B". For convenience of description, only two vertical directions "A" and "B" are illustrated, but the electronic device 200 of the present disclosure may generate a plurality of beam groups in a plurality of vertical directions.

Referring to reference numeral 2303, according to an embodiment, the first beam group 2310 may include a plurality of beams formed in different directions on a plane corresponding to direction "A". According to an embodiment, the second beam group 2320 may include a plurality of beams formed in different directions on a plane corresponding to direction "B". For convenience of description, an example is illustrated as each of the first beam group 2310 and the second beam group 2320 includes fourth beams, but the number of beams in a beam group is not limited thereto. For example, the electronic device 200 of the present disclosure may generate beam groups such that each beam group includes a plurality of beams.

Referring to reference numeral 2305, a communication device (e.g., the communication device 222 of FIG. 2) may generate a plurality of beams which are formed in a direction perpendicular and/or parallel to a surface of an antenna array (e.g., the first antenna array 340 of FIG. 3) of the communication device. For example, referring to reference number 2305, the communication device may generate beams oriented in a plurality of directions, depending on oriented directions of the respective beams illustrated by an arrow In FIG. 23, a description is given with respect to one surface of the electronic device 200, but the plurality of beams described with reference to FIG. 23 may be formed with respect to any surface of the electronic device 200.

Figure 18:
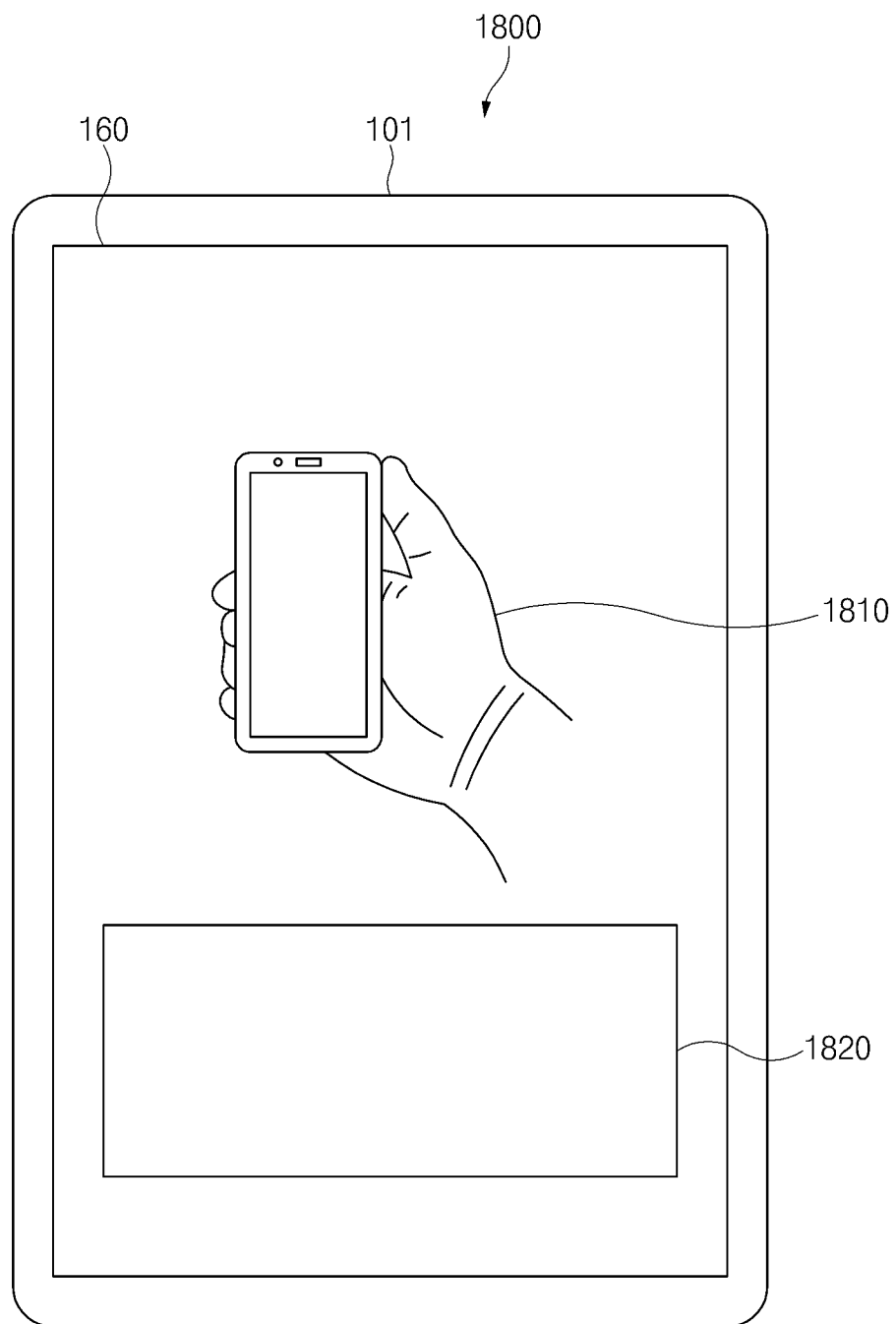
FIG. 18 is a diagram illustrating an example of a notification interface according to various embodiments.

FIG. 18 is a diagram illustrating a notification interface 1800 of an electronic device according to various embodiments.

According to various embodiments, when a blockage is detected, the processor 120 of an electronic device (e.g., the electronic device 101 of FIG. 1) may display a notification interface 1800 in at least a portion of the display device 160. For example, the processor 120 may display the notification interface 1800 depending on operation 1635 of FIG. 16.

According to an embodiment, the notification interface 1800 may include grip information 1810 for addressing the blockage. For example, the grip information 1810 may include an image associated with a recommended grip.

According to an embodiment, the notification interface 1800 may include a pop-up image 1820 providing information about a blockage. For example, the pop-up image 1820 may include information about the blockage and/or a notification associated with connection loss.

In the embodiment of FIG. 18, the notification interface 1800 may be provided on the display device 160, but a notification is not limited to a visual notification. For example, the processor 120 may provide a visual notification, an auditory notification, and/or a tactile (or haptic) notification.

Figure 19:
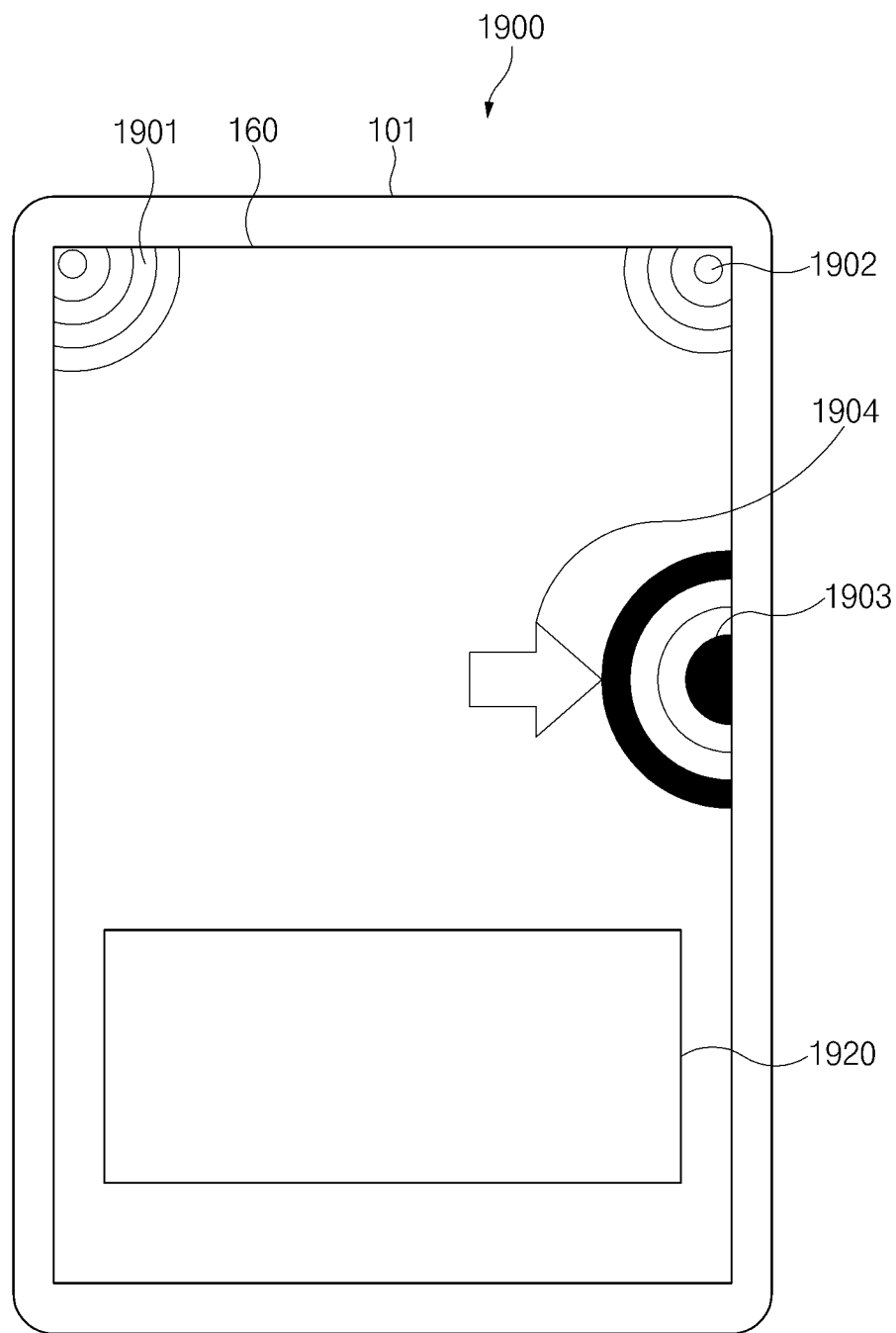
FIG. 19 is a diagram illustrating another example of a notification interface according to various embodiments.

FIG. 19 is a diagram illustrating another example of a notification interface according to various embodiments.

According to various embodiments, when a blockage is detected, the processor 120 of an electronic device (e.g., the electronic device 101 of FIG. 1) may display a notification interface 1900 in at least a portion of the display device 160. For example, the processor 120 may display the notification interface 1900 depending on operation 1635 of FIG. 16.

According to an embodiment, the notification interface 1900 may include a first indicator 1901, 1902, 1903 indicating an antenna location (e.g., a location corresponding to the communication device 221, 222, 223, or 224).

According to an embodiment, in the case where a blocked location is detected, the processor 120 may display the blocked location by changing display attributes (e.g., a color and/or a shape). According to an embodiment, the electronic device 101 may display the blocked location by displaying a second indicator 1904 indicating the blocked location.

According to an embodiment, the processor 120 may display information for solving the blockage. For example, the electronic device 101 may display a pop-up image 1920 providing information about a recommended operation. For example, the pop-up image 1920 may include information about the blockage and/or a notification associated with connection loss.

In the embodiment of FIG. 19, the notification interface 1900 may be provided on the display device 160, but a notification is not limited to a visual notification. For example, the processor 120 may provide a visual notification, an auditory notification, and/or a tactile (or haptic) notification.

According to various embodiments, an electronic device (e.g., the electronic device 200 of FIG. 2) may include a housing 210, an array (e.g., the first antenna array 340 and/or the second antenna array 345 of FIG. 3) that includes a plurality of antenna elements (e.g., 440 and/or 450 of FIG. 4) positioned within the housing 210, and a wireless communication circuit (e.g., the communication module 250) configured to transmit and/or receive a signal having a frequency in a range of 3 GHz to 300 GHz. For example, the wireless communication circuit includes a plurality of pairs (e.g., the RF chains 540-1 to 540-N of FIG. 5A) of transmit/receive paths, and the wireless communication circuit may be configured to allow a first pair of the plurality of pairs to use the transmit path of the first pair and a second pair of the plurality of pairs to use the receive path of the second pair, to transmit a first signal using the transmit path of the first pair, to monitor the receive path of the second pair, and to determine whether the first signal is at least partially blocked, based at least partially on a result of monitoring the receive path.

For example, the plurality of antenna elements of the array may face the same direction.

For example the wireless communication circuit may be configured to allow a first group of the plurality of pairs to use the transmit paths of the first group and a second group of the plurality of pairs to use the receive paths of the second group, to transmit a first signal using the transmit paths of the first group, to monitor the receive paths of the second group, and to determine whether the first signal is at least partially blocked, based at least partially on a result of monitoring the receive paths.

For example, the wireless communication circuit may be configured to allow the first pair to use the transmit path of the first pair and the second pair to use the receive path of the second pair, based at least partially on at least one of a movement, a wireless communication state of the electronic device, or a specified period.

For example, when the first signal is blocked by a specified value or greater, the wireless communication circuit may be configured to perform a bean scan using at least a part of remaining pairs of the plurality of pairs other than the first pair. For example, the wireless communication circuit may be configured to perform the beam scan using a maximum power for amplification of the remaining pairs or a phase change of the remaining pairs based on the number of the remaining pairs.

According to various embodiments, an electronic device (e.g., the electronic device 200 of FIG. 2) may include at least one antenna array (e.g., the antenna element 340 or 345 of FIG. 3) that includes a plurality of antenna elements (e.g., the antenna elements 440 or 445 of FIG. 4), and a communication circuit (e.g., the communication module 250) that is electrically connected with the at least one antenna array, and each of the plurality of antenna elements may be selectively connected to a receive path or a transmit path. For example, the communication circuit may be configured to set at least one first antenna element and at least one second antenna element of the plurality of antenna elements, to transmit a reference signal through the at least one first antenna element, and to detect at least one blocked antenna element of the at least one first antenna element based at least on a signal measured through the at least one second antenna element.

For example, the communication circuit may be configured to set the at least one first antenna element and the at least one second antenna element by connecting the at least one first antenna element to a transmit path and connecting the at least one second antenna element to a receive path, to receive a signal induced by the reference signal through the at least one second antenna element, and to determine that at least a portion of the at least one first antenna element is blocked, when a strength of the induced signal is not smaller than a specific range. For example, the communication circuit may set the at least one first antenna element and the at least one second antenna element such that the at least one first antenna element and the at least one second antenna element are alternately positioned in the at least one antenna array. For example, the communication circuit may be configured to determine the at least one blocked antenna element based on a location of a second antenna element through which the induced signal having a strength of the specific range or greater is detected.

According to an embodiment, the communication circuit may be configured to perform a beam scan based at least on the detected blockage. For example, the communication circuit may be configured to perform the beam scan using remaining antenna elements of the plurality of antenna elements other than the at least one blocked antenna element. For another embodiment, the communication circuit may be configured to perform the beam scan using a maximum power for amplification of each of the remaining antenna elements, when the number of the remaining antenna elements is smaller than a specified value. For example, the communication circuit may be configured to perform the beam scan by adjusting a phase associated with the remaining antenna elements, when the number of the remaining antenna elements is smaller than the specified value.

According to an embodiment, the communication circuit may be configured to set the at least one first antenna element and the at least one second antenna element based on at least one of a movement or a quality of communication of the electronic device.

According to an embodiment, the communication circuit may be configured to set the at least one first antenna element and the at least one second antenna element based on a specified period.

According to an embodiment, the communication circuit may be configured to set the at least one first antenna element and the at least one second antenna element by connecting the at least one first antenna element and the at least one second antenna element to a transmit path, to obtain a strength of a signal induced by the reference signal through the at least one second antenna element using a transmitted signal strength indicator included in the transmit path, and to determine that at least a portion of the at least one first antenna element is blocked, when the strength of the induced signal is not smaller than a specific range.

According to an embodiment, the communication circuit may be configured to set the at least one first antenna element and the at least one second antenna element by connecting the at least one first antenna element to a transmit path and connecting the at least one second antenna element to a receive path, to receive a signal induced by the reference signal through the at least one second antenna element, and to detect the at least one blocked antenna element based on in-phase and quadrature phase information of the reference signal and the induced signal.

According to an embodiment, the electronic device may further include a display (e.g., the display device 160 of FIG. 1), and a processor (e.g., the processor 120) that controls the display and the communication circuit, and the processor may be configured to display information for guiding a grip of the electronic device on the display, when the number of the at least one blocked antenna element is not smaller than a specified value.

According to an embodiment, the communication circuit may be configured to transmit and receive a signal having a frequency in a range of 3 GHz to 300 GHz.

While the present disclosure has been illustrated and described with reference to various example embodiments thereof, it will be understood by those skilled in the art that various changes in form and details may be made therein without departing from the spirit and scope of the present disclosure as defined, for example, by the appended claims and their equivalents.

What is claimed is:

1. A portable communication device comprising:
   a first antenna array including a first antenna and a second antenna;
   a second antenna array including a third antenna and a fourth antenna;
   a first radio frequency integrated circuit electrically connected with the first antenna array;
   a second radio frequency integrated circuit electrically connected with the second antenna array; and
   a processor electrically connected with the first radio frequency integrated circuit and the second radio frequency integrated circuit;
   wherein the first radio frequency integrated circuit is configured to:
     transmit a first signal to an outside of the portable communication device via the first antenna; and
     receive, while the first signal is transmitted via the first antenna, a second signal corresponding to the first signal via the second antenna, and wherein the processor is configured to:
     determine whether the second signal satisfies a specified condition to determine blockage of the first antenna array,
     if the specified condition is not satisfied, perform a beam forming using the first radio frequency integrated circuit; and
     if the specified condition is satisfied, perform a beam-forming using the second radio frequency integrated circuit and the second antenna array.

2. The portable communication device of claim 1, wherein the processor is further configured to:
   if the specified condition is satisfied, perform the beam-forming without using the first radio frequency integrated circuit, the first antenna or the second antenna.

3. The portable communication device of claim 1, further comprising:
   a printed circuit board (PCB) on which the first antenna array and the second antenna array are formed.

4. The portable communication device of claim 1, further comprising:
   a first PCB on which the first antenna array is formed; and
   a second PCB on which the second antenna array is formed.

5. The portable communication device of claim 1, wherein the first antenna and the second antenna face in a first direction, and the third antenna and the fourth antenna face in a second direction different from the first direction.

6. The portable communication device of claim 1, wherein the processor is further configured to:
   determine that the specified condition is satisfied based on a strength of the second signal exceeding a threshold.

7. The portable communication device of claim 1, wherein the processor is further configured to:
   determine that the specified condition is satisfied based on an occurrence of a blockage of at least one portion of the signal path by an external object.

8. The portable communication device of claim 7, wherein the processor is further configured to:
   identify, based on the second signal, a range of the blockage; and
   provide a notification based on a determination that the range of the blockage falls within a specified range.

9. The portable communication device of claim 7, further comprising:
   a display; and
   wherein the processor is further configured to provide a notification corresponding to the blockage via the display.

10. The portable communication device of claim 1, wherein the first radio frequency integrated circuit and the second radio frequency integrated circuit form at least one portion of a same radio frequency integrated circuit chip.

11. A portable communication device comprising:
an antenna array including a first antenna, a second antenna, and a third antenna;
a radio frequency integrated circuit electrically connected with the first antenna, the second antenna, and the third antenna; and
a processor electrically connected with the radio frequency integrated circuit,
wherein the radio frequency integrated circuit is configured to:
transmit a first signal to an outside of the portable communication device via the first antenna; and
receive, while the first signal is transmitted via the first antenna, a second signal corresponding to at least one portion of the first signal via the second antenna; and
wherein the processor is configured to:
determine whether the second signal satisfies a specified condition to determine blockage of the first antenna;
if the specified condition is not satisfied, perform a beam scanning using the radio frequency integrated circuit, the first antenna, and the second antenna; and
if the specified condition is satisfied, perform a beam scanning using the radio frequency integrated circuit and the third antenna.

12. The portable communication device of claim 11, wherein the processor is further configured to:
if the specified condition is satisfied, perform the beam scanning without using the first antenna or the second antenna.

13. The portable communication device of claim 11, wherein the processor is further configured to:
determine that the specified condition is satisfied based on a strength of the second signal exceeding a threshold.

14. The portable communication device of claim 11, wherein the processor is further configured to:
determine that the specified condition is satisfied based on an occurrence of a blockage of at least one portion of the signal path by an external object.

15. The portable communication device of claim 14, wherein the processor is further configured to:
identify, based on the second signal, a range of the blockage; and
provide a notification based on a determination that the range of the blockage falls within a specified range.

16. The portable communication device of claim 14, further comprising:
a display; and
wherein the processor is further configured to provide a notification corresponding to the blockage via the display.

* * * * *